United States Patent [19]
Cummiskey et al.

[11] Patent Number: 5,177,734
[45] Date of Patent: Jan. 5, 1993

[54] MULTIRATE WIRE LINE MODEM APPARATUS

[75] Inventors: Peter Cummiskey, Clark, N.J.; Marvin Epstein, Monsey, N.Y.; Paul A. Gilmour, Bloomfield; Richard Kim, Nutley, both of N.J.

[73] Assignee: ITT Corporation, New York, N.Y.

[21] Appl. No.: 624,570

[22] Filed: Dec. 10, 1990

Related U.S. Application Data

[62] Division of Ser. No. 189,497, May 2, 1988, Pat. No. 5,005,168.

[51] Int. Cl.$^5$ .............................................. H04L 5/14
[52] U.S. Cl. .................................... 370/32.1; 379/410
[58] Field of Search ............... 370/32.1; 379/410, 411, 379/3

[56] References Cited

U.S. PATENT DOCUMENTS

| | | | |
|---|---|---|---|
| 4,007,341 | 2/1977 | Sourgens et al. | 379/411 |
| 4,594,479 | 6/1986 | Farrow et al. | 379/3 |
| 4,682,358 | 7/1987 | Werner | 370/32.1 |

Primary Examiner—Curtis Kuntz
Assistant Examiner—T. Ghebretinsae
Attorney, Agent, or Firm—Arthur L. Plevy

[57] ABSTRACT

Multirate wire line modem apparatus operable at either of two rates in either transmission or reception modes is provided according to the teachings of the instant invention. Full duplex operation and echo cancellation are utilized for both voice and data. Structurally an IOP processor acts as a system controller in controlling transmission and reception digital signal processors which provide the independent transmission and reception functions of the resulting multirate modem apparatus.

12 Claims, 22 Drawing Sheets

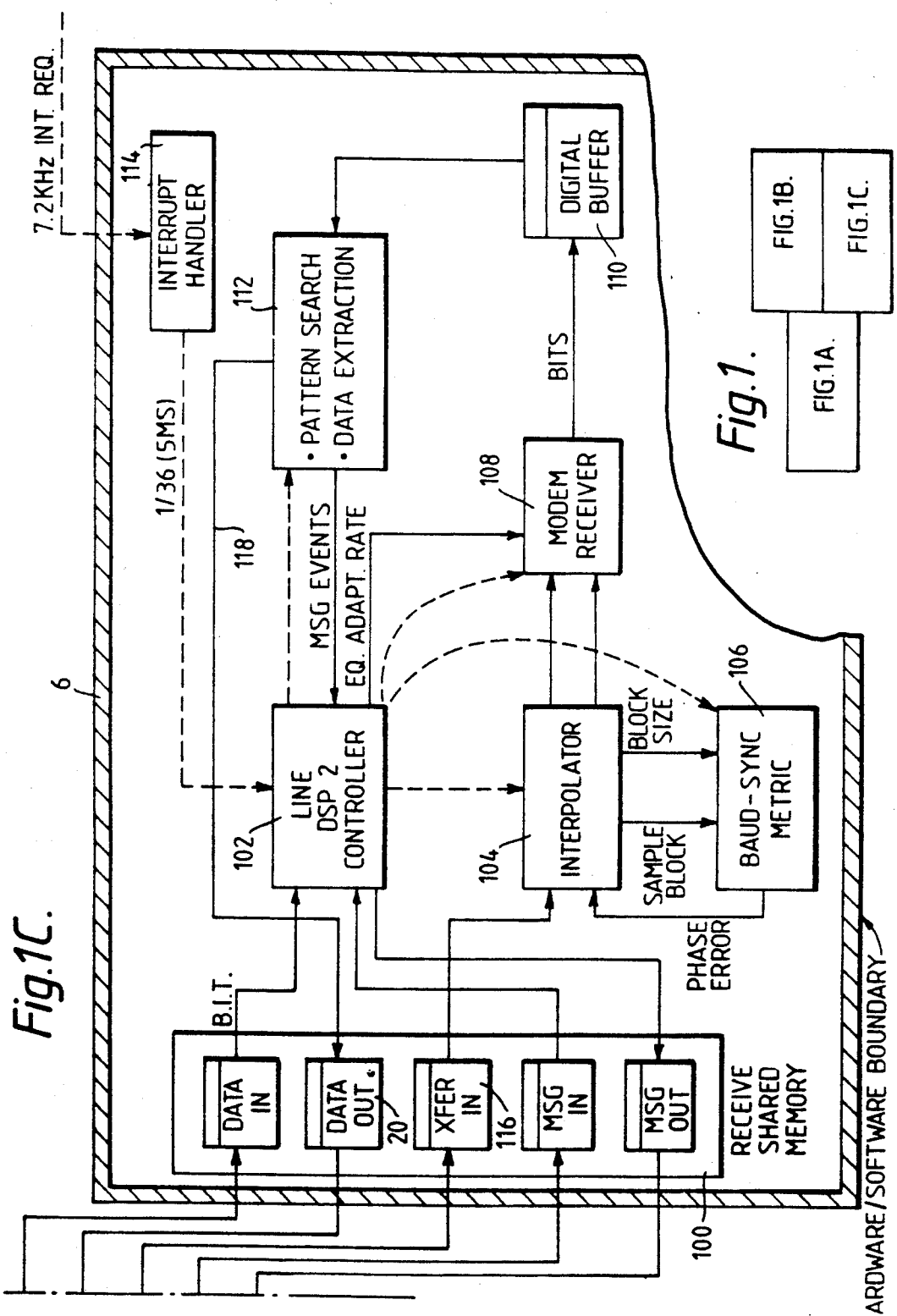

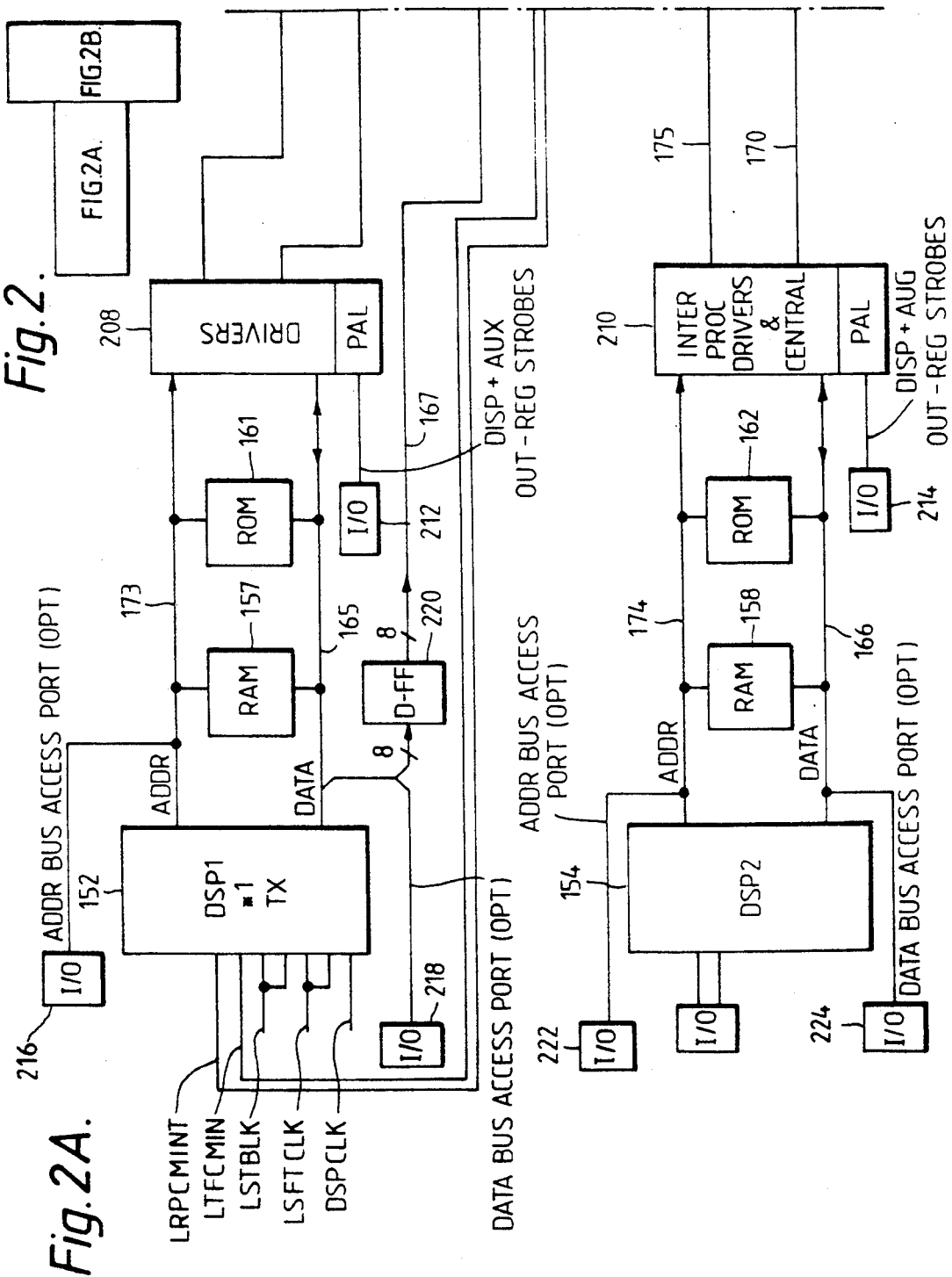

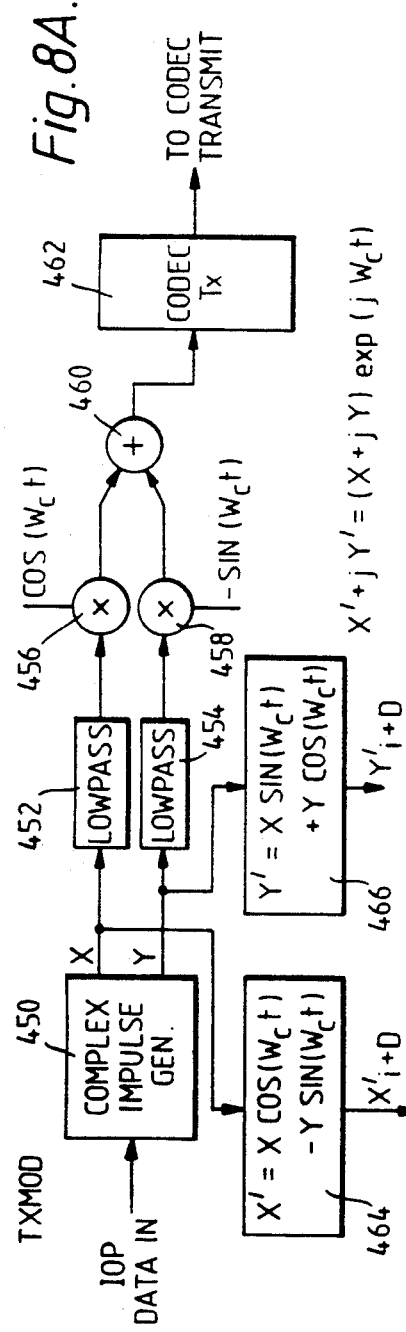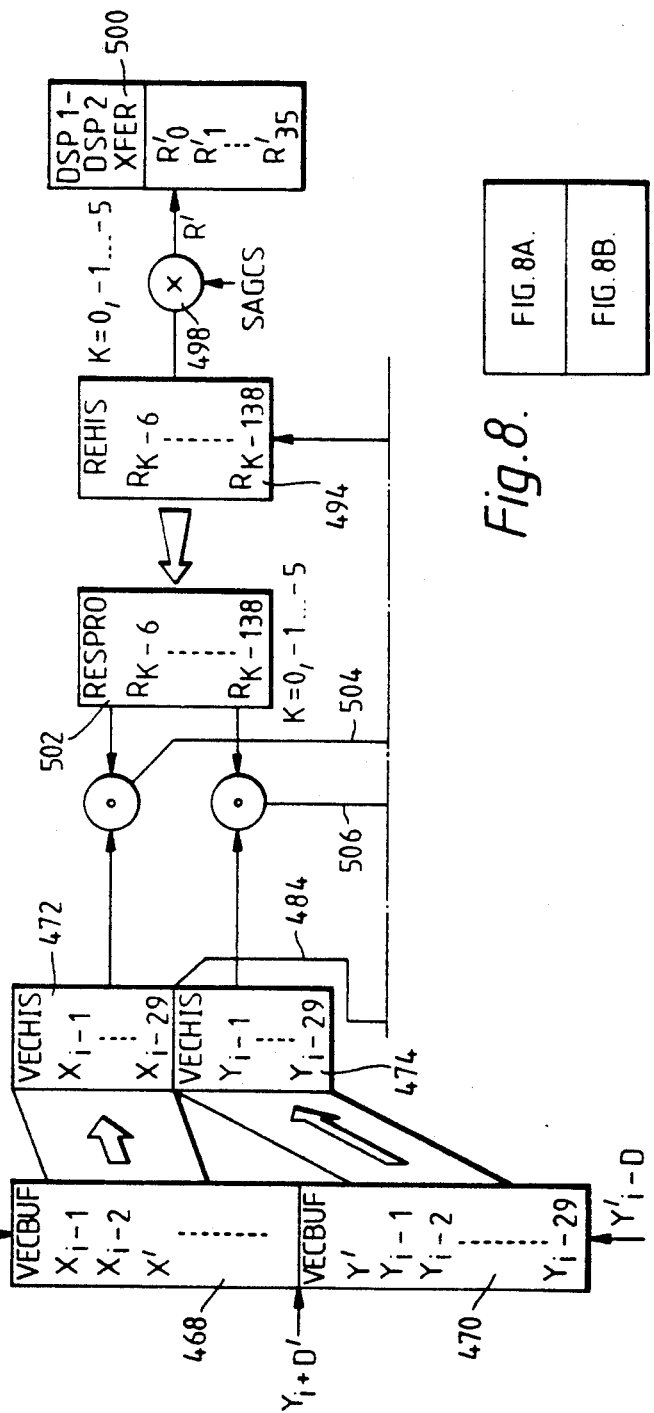

MULTIRATE WIRE LINE MODEM APPARATUS

This is a divisional of application Ser. No. 07/189,497, filed May 2, 1988 U.S. Pat. No. 5,005,168.

BACKGROUND OF THE INVENTION

This invention relates to modulator/demodulator (modem) apparatus and more particularly to multirate wire line modem apparatus.

The wide proliferation of data transmission over telephone lines and the like has created a need for versatile modem apparatus capable of determining the highest rate at which data is available and accepting or transmitting the same at the highest corresponding rate available. Variable rate modem apparatus is preferred since through the use of this form of modem apparatus the highest rate of the transmitter and/or receiver may be accommodated any time the receiving and/or transmitting station can operate at this rate while lesser rates are available for stations having lesser capability. Thus the instant invention is directed to multirate wire line modem apparatus wherein, according to a preferred mode, the multirate modem apparatus set forth may operate at either 2400 bits per second (bps) or 4800 bps in either transmission or reception modes.

While data rates have upper limits of transmission which under all circumstances are imposed by the transmitting and receiving stations, the highest rates available are frequently foreclosed by the quality of the transmission medium employed. Thus where telephone lines are employed the quality of the line will often limit the maximum data rate available. When voice is involved the quality of the telephone lines is not highly significant. However, here full duplex modes of operation are highly desirable. Furthermore, for voice applications, full duplex operation with the same data rate in each direction is not only desirable but yields highly secure modes of communication which are becoming increasingly important.

One technique for achieving full duplex operation for voice and data transmissions has involved band splitting. This however while compensating for the quality of the telephone lines employed for transmission effectively halves the data rate.

The present invention recognizes that echo cancellation techniques may be employed to improve the apparent quality of a pair of telephone lines utilized for full duplex transmission of voice and data. Furthermore, through the use of echo cancellation employing training for both automatic gain control and the echo cancellation imposed, telephone lines of adequate quality for voice may often be successfully employed for full duplex transmission and reception of data, particularly when such data is accompanied with sufficient protection to allow training to be completed prior to actual data transmission.

The instant invention also recognizes that the modem function may be integrated into a line system function to markedly reduce the system hardware costs involved. This integration yields multirate modem apparatus providing function control, echo cancellation and full duplex modes of operation utilizing a single pair of wires.

The multirate wire line modem apparatus set forth is configured so that the same is controlled by an input/output processor (IOP) which acts as a system controller and as such controls a pair of digital signal processors (DSP 1 and DSP 2). DSP 1 contains and controls the transmission functions of the modem apparatus together with such ancillary functions as echo canceling, automatic gain control and tone detection. DSP 2 controls the receiver functions of the modem.

The IOP, $DSP_1$ and $DSP_2$ are separately programmed so that the same may in fact act as parallel processors which, once instructed, act in an essentially independent manner. The multirate modem apparatus set forth provides a tone detection and echo cancellation. Reception is performed employing a phase-locked loop function and an adaptive equalizer. The apparatus is capable of tracking a transmitted symbol rate for a symbol-frequency offset of up to 100 parts per million to achieve receiver synchronization. Automatic gain control circuitry in the form of hardware is controlled by software generated control signals to enable input level ranges of from 0 DBM to −40 DBM to be processed. Negative logarithm functions are employed in the automatic gain control circuitry to achieve adequate range in single precision arithmetic. Thus, in this manner, multirate wire line modem apparatus which is capable of communicating with transmitting and receiving stations at the highest rate available is achieved.

Therefore, it is a principal object of the present invention to provide improved multirate wire line modem apparatus.

Various other objects and advantages of the present invention will become clear from the following detailed description of an exemplary embodiment thereof and the novel features will be particularly pointed out in conjunction with the claims appended hereto.

SUMMARY OF THE INVENTION

In accordance with the teachings of the present invention multirate wire line modem apparatus for operating in either of two rates in either transmission or reception modes is provided wherein an IOP processor acts as a system controller in controlling transmission and reception and wherein digital signal processors provide the independent transmission and reception functions of the resulting multirate modem apparatus.

BRIEF DESCRIPTION OF THE DRAWINGS

The invention will be more clearly understood by reference to the following detailed description of an exemplary embodiment thereof in conjunction with the accompanying drawings in which:

FIG. 1, including FIGS. 1A-1C, is a schematic block diagram illustrating the overall details of an exemplary embodiment of the multirate modem apparatus according to the present invention;

FIG. 2, including FIGS. 2A and 2B, is a schematic diagram of actual hardware which may be employed in the embodiment of the invention illustrated in FIG. 1;

FIG. 8, including FIGS. 8A and 8B, is a signal processing diagram indicating the manner in which a second embodiment of echo cancellation apparatus according to the instant invention may be implemented under software control;

FIGS. 15A and 15B are flow charts indicating the manner of operation of the demodulator shown in FIG. 13 wherein FIG. 15A is a first portion of the flow chart and FIG. 15B is a second portion thereof.

DETAILED DESCRIPTION OF THE FIGURES

Figure 1A:
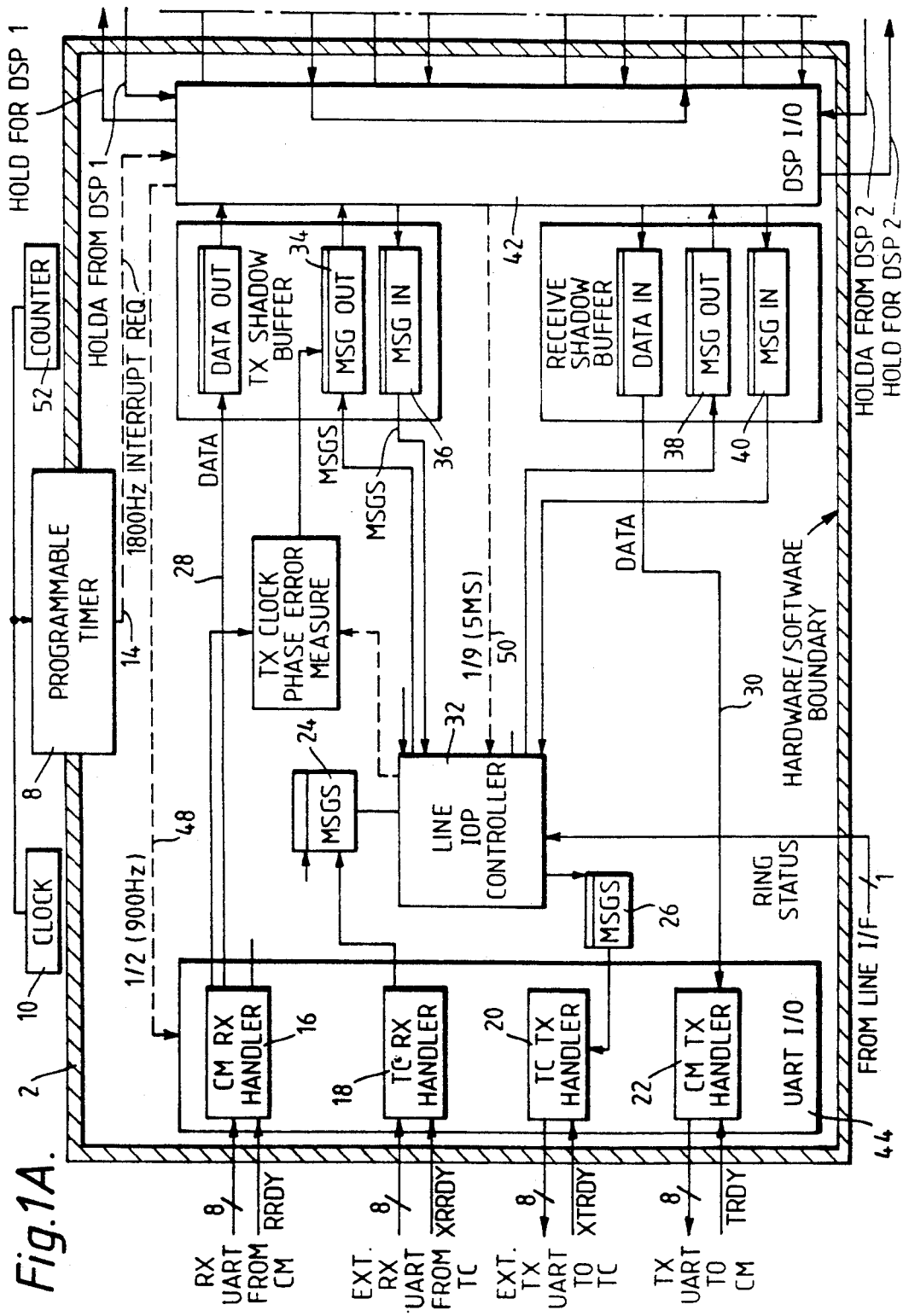
Figure 1B:
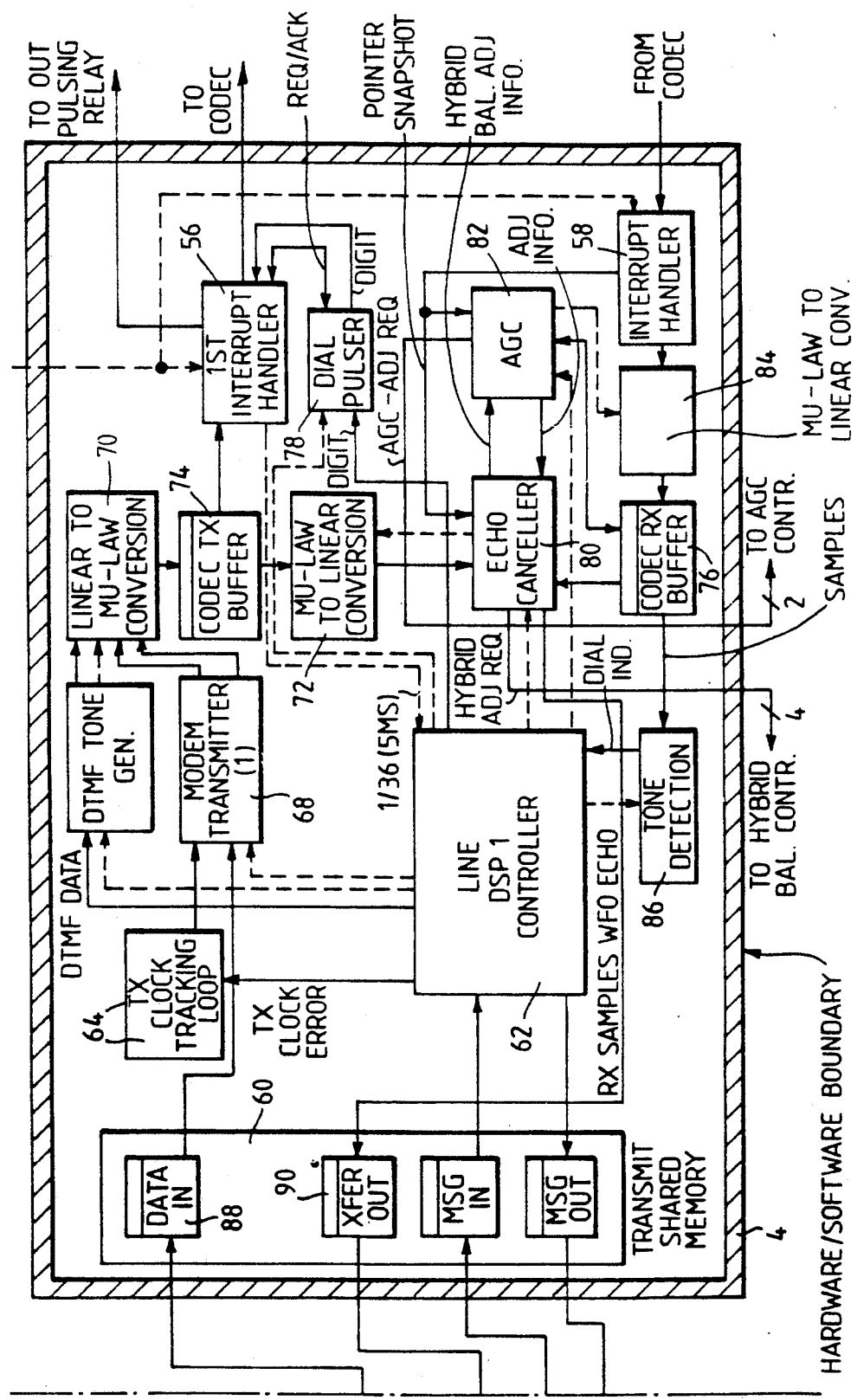
Figure 2B:
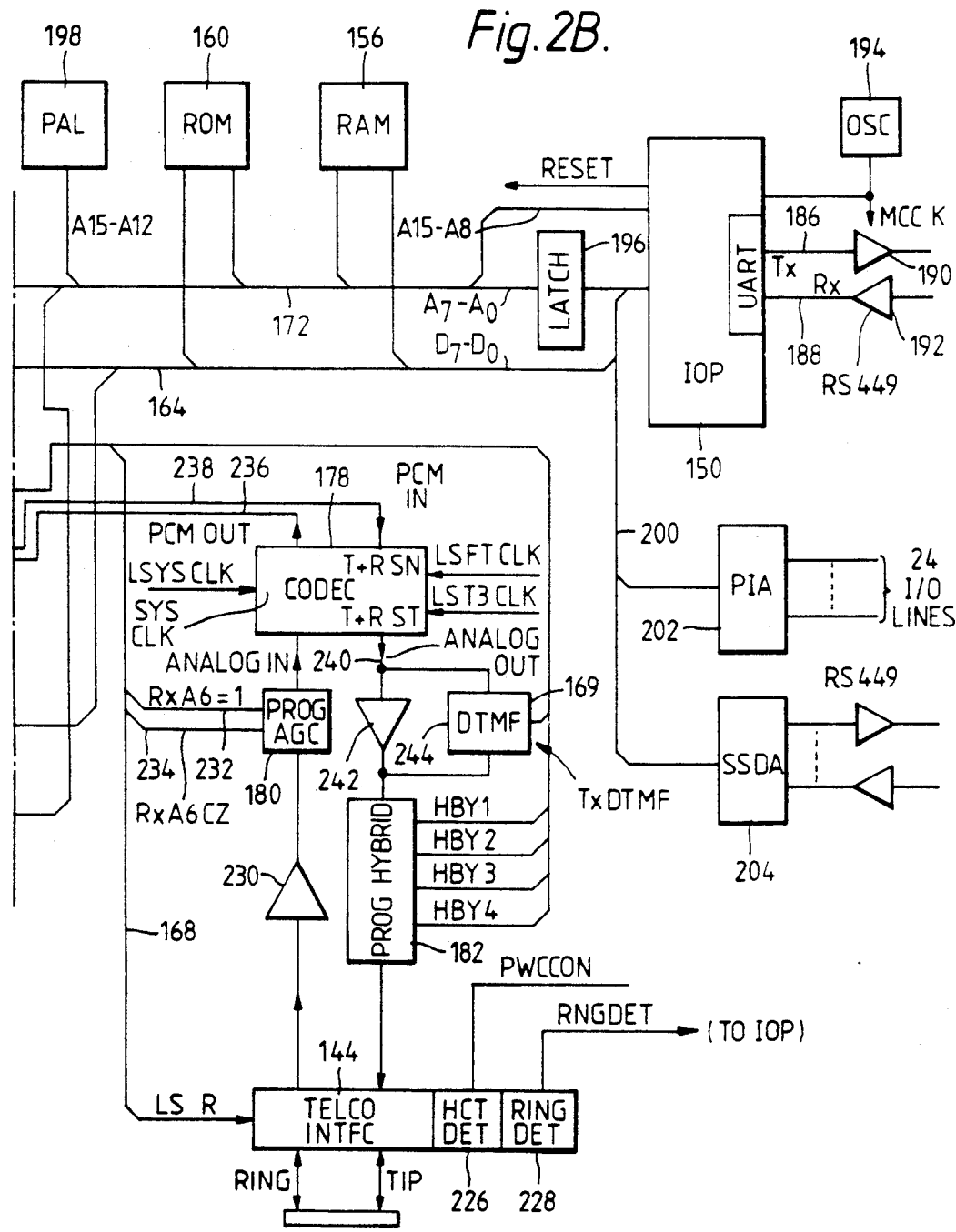

Referring now to the drawings and, more particularly, FIG. 1 thereof, there is shown a schematic block diagram illustrating the overall details of an exemplary embodiment of the multirate modem apparatus according to the present invention. The schematic block diagram of the multirate modem apparatus illustrated in FIG. 1 is effectively a block diagram which shows software functions, buffers, data flow and control flow of the system. A diagram strictly setting forth hardware is shown in FIG. 2. However, the schematic block diagram of FIG. 1 is considered to better illustrate the overall details of the instant invention and facilitate understanding thereof by those of ordinary skill in the art.

The schematic block diagram shown in FIG. 1 is selected since, in real time, the software employed within the instant invention runs with a high degree of concurrency and parallelism. Thus in FIG. 1 synchronization, for example, of interrupt processes, buffers and processing functions are shown without reference to the specific type of processor or programming language employed. In FIG. 1 a hardware/software boundary 2, 4 and 6 is illustrated as separating hardware devices from software. Thus, the hardware/software boundary 2 indicates the presence of the IOP processor while the hardware/software boundary 4 indicates the presence of the DSP$_1$ processor. The hardware/software boundary 6 indicates the presence of the DSP$_2$ device. In actuality, separate processors, as shall be further explained in connection with FIG. 2, are employed for the IOP processor 2 and each of the digital signal processors DSP$_1$ and DSP$_2$. However, as will be readily appreciated by those of ordinary skill in the art, much of the remaining elements set forth in FIG. 1 are implemented in software utilizing processing power available within the processors selected.

In addition, in FIG. 1 solid lines which penetrate the hardware/software boundaries 2, 4 and 6 represent data and control paths from hardware devices to software devices as well as the converse thereof. These data paths represent registers which the software can read or write. Similarly, dashed lines which penetrate the hardware/software boundary represent timing signals which periodically initiate the software processes. Within each hardware/software boundary, a software process such as an interrupt handler is identified by a rectangle while a buffer is indicated by a rectangle with a bar on the upper portion. Solid lines represent data paths while dashed lines represent control paths. As indicated, each software process is provided with a source of control, a source and receiver for data and every buffer is provided with a source and receiver for data.

With the foregoing drawing conventions understood the schematic block diagram of the exemplary embodiment of the multirate modem apparatus according to the instant invention may be considered to comprise an input/output processor (IOP) indicated by the hardware/software boundary 2, and first and second digital signal processors DSP$_1$ and DSP$_2$ indicated by the hardware/software boundaries 4 and 6. The IOP processor 2 may be configured from a conventional processor such as a Hitachi HD6301V1 processor device. The input/output processor 2 acts within the instant invention to control each of the digital signal processors (DSP$_1$ and DSP$_2$) as well as all communications therebetween. As such, the IOP 2 acts as a system controller which controls each of the DSP$_1$ and DSP$_2$ processors and communicates with other subsystems. The IOP 2 is configured so as to consist of the following state machines: a top level executive, a modem supervisor, and modem controller with test subsystems (i.e. loop back initiator and loop back responder). A state machine is defined as a high level program which, when called, operates independently within the distributed multiprocessing/parallel processing environment established.

The IOP processor 2 is provided with a programmable timer 8 which, as indicated in FIG. 1, provides a divide by 1024 function for the system clock 10. The output of the system clock 10 is initially divided by four by a conventional counter so that the output of the programmable timer 8, as indicated on dashed conductor 14, corresponds to an 1800 Hz clock signal which is employed, as indicated, to generate required interrupts for the IOP 2.

The IOP communicates with other subsystems through UART receiver and transmitter devices in the conventional manner. Thus, as indicated in FIG. 1, the IOP is provided with a pair of UART receiver handlers 16 and 18, and a pair of UART transmit handlers 20 and 22. The UART devices 16, 18, 20 and 22 are entirely conventional, each being provided with a pair of outputs and a single input as shown. One UART receive handler 18 and one UART transmit handler 20 within this group is provided for direct communications by the IOP; hence each device is provided with a message buffer 24 and 26. The UART receive handler 16 is provided for data communications with the digital signal processor $DSP_1$ as indicated by the data line 28. Conversely, the UART transmit handler 22 is provided for communications directly with digital signal processor $DSP_2$ as indicated by the data line 30. As shall become apparent below, the digital signal processor $DSP_1$ performs the functions of the transmitter within the multirate modem apparatus set forth while the digital signal processor $DSP_2$ performs receiver functions.

Each of the message buffers 24 and 26 communicate with the line IOP controller 32 which actually performs the functions of controlling communications or the flow of data to or from external sources through the UART devices as well as further conveyancing of data received from the digital signal processor $DSP_1$ or to the digital signal processor $DSP_2$.

Data from the line IOP controller 32 is conveyed between the digital signal processor $DSP_1$ through a pair of message buffers 34 and 36. The message buffers 34 and 36 are employed for the unidirectional transfer of data wherein the message buffer 34 is employed to transmit data from the IOP to the digital signal processor $DSP_1$ and conversely the message buffer 36 is utilized to convey data from the digital signal processor $DSP_1$ to the IOP. Both the message buffers 34 and 36 may be configured in software as conventional buffers.

The line IOP controller 32 communicates with the digital signal processor $DSP_2$ through a pair of dedicated message buffers 38 and 40. Here the message buffer 38 is employed to convey data from the IOP to the $DSP_2$ unit while the message buffer 40 is employed to convey data from the $DSP_2$ processor to the IOP. The buffers 38 and 40 may be configured in software in precisely the same manner as the message buffers 34 and 36. Each of the message buffers 34, 36, 38 and 40 are interfaced to an IO process 42 which controls input/output operations between the IOP and the first and second digital signal processors $DSP_1$ and $DSP_2$. The IO buffer 42 may be configured as 36 8 bit buffers. The IO process 42 provides HOLD and receives HOLDA inputs for controlling communications between each of the digital signal processors $DSP_1$ and $DSP_2$ as indicated in FIG. 1.

In typical applications the IOP 2 through its UART IO 44 communicates with subscriber systems in bursts of 14,400 bps (i.e., 8 bits per byte and 1,800 bytes per second). Both data and control signals are controlled through this device.

The 1,800 hz local interrupt signal generated by the programmable timer 8 is also supplied to the digital signal processor I/O 42 as indicated by the dashed conductor 14. The interrupt handler present within the DSP I/O 42 supplies interrupts at a halved rate to the UART IO 44 as indicated by the dashed conductor 48. The UART IO 44 in turn communicates with additional external subsystems as shown. The interrupt handler present within the DSP I/O 42 also controls the timing of the out pulsing relay for dial pulsing through $DSP_1$ and is a source of control for the line IOP controller as indicated by the dashed conductor 50. The line IOP controller 32 executes periodically at an interval of 5 ms. The line IOP controller 42 employs state and event tables as well known to those of ordinary skill in the art to determine when to evoke its subordinate processes and acts to send and receive messages through buffers to and from the first and second digital signal processors $DSP_1$ and $DSP_2$ as well as to external systems.

A dial pulser, not shown, controls the sequence of digits for dial pulsing. Data and traffic generators format the data and traffic which is sent to and received from the local digital signal processors $DSP_1$ and $DSP_2$. A DMA transfer process is the principal communication link among the IOP and the two digital signal processors $DSP_1$ and $DSP_2$ in the system. The purpose of this process is to keep the information in the message and data buffers of a receiving processor up to date with that in the shared buffers of the sending processor. There are nine general types of DMA transfer in the line subsystem illustrated in FIG. 1 as follows: (1) data from IOP to $DSP_1$, (2) data from IOP to $DSP_2$, (3) data from $DSP_1$ to IOP, (4) data from $DSP_2$ to IOP, (5) control message from IOP to $DSP_1$, (6) control message from IOP to $DSP_2$, (7) control message from $DSP_1$ to IOP, (8) control message from $DSP_2$ to IOP and (9) data from $DSP_1$ to $DSP_2$.

To perform a DMA operation, the DMA transfer process halts the appropriate digital signal processor by asserting the hold signal illustrated in FIG. 1 for the appropriate digital signal processor and waits for the digital signal processor hardware to acknowledge the hold via the HOLDA signals indicated in FIG. 1. Thereafter the appropriate processor performs a read or write to a message or data buffer of the digital signal processors memory. To prevent the digital signal processor from missing a sampling interrupt as generated by the output of the divide by 1024 circuit 52, which occurs at 7.2 khz as indicated, the DMA operation is structured to perform its DMA transfers in blocks synchronously with the 7.2 khz sampling interrupt. The size of a block is less than or equal to a fixed maximum length. The DMA transfer of a block involves the moving of data from the sender shadow buffer to the receiver buffer and the updating of pointers of the receiver buffer. Should the digital signal processor hardware take too long to acknowledge the HOLD signal, the DMA transfer process removes the HOLD signal and waits for the next interrupt cycle to repeat the block transfer attempt. This may be caused by certain infrequently used instruction sequences in a digital signal processor which will thus cause the noted time out. The DMA block transfer must be completed within a time interval less than the sampling period of the 7.2 khz sampling clock.

The IOP controller 32 and the IOP responds to higher level events in the line subsystem such as request to send, high low rate, data ready and the like. It also responds to events occurring within the digital signal processors such as tone, signal and message detection, progress indicators and the like. The IOP controller 32 is effectively divided into two major parts which correspond to stand alone initiation (transmit) and stand alone responder (receive). Each part effectively acts as a separate controller which is entered from the executive controller which directs power up operations and the response to the request to send from the terminal or an initial 2100 hz tone detection at the digital signal processor $DSP_1$. In response to a request to send, the IOP controller 32 executes the states required of the calling party. In response to a 2100 hz tone detection the IOP enters the responder states where it receives the call. The operation of the IOP controller in its stand alone initiator and stand alone responder modes is described in greater detail below.

The transmit digital signal processor $DSP_1$ comprises first and second interrupt handlers 56 and 58, a transmit memory 60, a controller 62, a transmit clock tracking loop 64, a DTMF tone generator 66, a modem transmitter 68, linear to MU-LAW and MU-LAW to linear converters 70 and 72, CODEC transmit and receive buffers 74 and 76, a dial pulser 78, an echo canceler 80, an AGC unit 82, a MU-LAW to linear converter 84 and a tone detect unit 86. The digital signal processor $DSP_1$ provides the functions of the transmitter portion of the modem as well as echo canceler, automatic gain control and tone detect functions. As indicated in FIG. 1, a 7.2 khz sampling clock provided as the output of counter 52 is supplied to the first and second interrupt handlers 56 and 58 within the digital signal processor $DSP_1$. This will generate an interrupt once per cycle. In response to the interrupt the interrupt handlers 56 and 58 read from and write to the coder decoder (CODEC) simultaneously as indicated by the appropriately annotated outputs from the first and second interrupt handlers 56 and 58. Once every 5 ms or 36 interrupts, the interrupt handler will cause the $DSP_1$ controller 62 to execute. Similar to its counterpart in the IOP, this controller processes messages and uses state and event tables to determine when to invoke subordinate processors.

For normal transmit traffic a transmit phase lock loop process implemented by the controller 62 in conjunction with the transmit clock tracking loop 64 determines the rate of data arrival and provides transmit-symbol-rate information to the modem transmitter 68. This will occur at a nominal rate of 2400 bps within a small tolerance. The phase lock loop process is necessary to insure that the timing for the data source, which is an external device, is locked onto the 7.2 khz sampling rate. When operating at 2400 bps, the modem transmitter 68 converts each DIBIT (a baud being equivalent to a pair of bits) of data received from the IOP by way of the data-in register within the transmit memory 60 into a phase shift of 45, 135, 315 or 225 degrees corresponding to a DIBIT value of 00, 01, 10 or 11 respectively. These phase shifts are added to a phasor which not only rotates one and one-half cycles per symbol period, as determined by the transmit phase lock loop imposed by the transmit clock tracking loop 64 but also is sampled at a rate locked to the 7.2 khz sampling clock to produce 36 samples nominally in the form of 6 symbols per 5 ms block time. These 36 samples are applied, as indicated in FIG. 1, to the linear to MU-LAW converter 70 where, as well known, the samples are semilogarithmically encoded into 8 bit values and are stored in the CODEC transmit buffer 74 for subsequent transfer to the CODEC through the interrupt handler 56.

For normal receive traffic, the interrupt handler 58 reads data from the CODEC at the input to interrupt handler 58 annotated "from CODEC" at a 7.2 khz sampling clock rate in synchronization with the sending of data for transmission. The data samples are converted from an 8 bit semi-logarithmic format to a 14 bit linear format by the MU LAW to linear converter 84 and thereafter stored in the CODEC receive buffer 76. The energy values of these stored samples are adjusted by the AGC unit 82 so as to adjust the energy of these samples to a desired reference level and when appropriate raises an event to inform the line $DSP_1$ controller 62 to send AGC messages to the IOP 2. The AGC sends drop out and signal detect messages. All other events are known to occur at fixed times after commends from the IOP 2.

The echo canceler 80 digitally filters receive samples provided by the CODEC receive buffer 76 to remove the transmit echo in a manner to be more fully described below. The filtering technique employed is continually updated with a correlation between the receive signal and the transmitted signal. This correlation, as more fully described below, employs transmit signals semilogarithmically compressed and then expanded, i.e. linear to MU-LAW to linear, in order that the samples accurately represent the analog data generated by the CODEC.

When appropriate IOP 2 sends a command to inform the line $DSP_1$ controller 62 to invoke hybrid balance subroutines. When these run to completion, an adjustment complete message is sent to the IOP through the transmit memory 60. Proper adjustment of the hybrid balance permits the software to represent the echo canceler filter weights with a greater resolution because the weight for a time delay of zero is much larger than any weight for a time delay greater than zero if the hybrid balance is properly adjusted. The hybrid adjust also improves CODEC signal to noise performance by reducing the echo signal. The operation of the echo canceler 80 deposits the echo removed samples into a transmit buffer 90 within the shared memory 60 which the IOP 2 sends to the digital signal processor $DSP_2$ for subsequent receive signal processing in a manner to be described below.

Dial pulse functions, as implemented by the dial pulser 78, as well as DTMF tone generation, as implemented by the DTMF tone generator 66, are controlled by the line $DSP_1$ controller in the manner indicated in FIG. 1. Similarly, tone detection operations are performed by the tone detect circuit 86 which provides a data input to the line $DSP_1$ controller 62.

The interrupt handling functions provided by the first and second interrupt handlers 56 and 58, as shown in FIG. 1, basically perform input/output operations with the CODEC as indicated by the appropriately annotated inputs and outputs therefrom. Writing to the transmit portion of the CODEC by the interrupt handler 56 and reading from the receive portion of the CODEC by the interrupt handler 58 are performed synchronously. The operations for the line $DSP_1$ controller are performed in much the same manner as its counterpart within the IOP in that it processes messages and uses state and event tables to determine when to invoke its subordinate processors. The digital signal processor $DSP_1$ may take the conventional form of a TI TMS 32020.

The DTMF tone generator 66 acts under software control to generate blocks of 7.2 khz samples representing a pair of tones in a manner well known to those of ordinary skill in the art. More particularly, in response to a message from the IOP, the $DSP_1$ controller 62 provides information in the form of data and control signals to the DTMF tone generator 66 through the solid and dashed conductors indicated. For each tone, an index is advanced through a table containing a single digitized sine wave cycle. The tone is advanced at a rate proportional to the frequency of the tone and wraps around the end of the table when required. For each 1/7200 second interval, the index is used to fetch a point from the table. This procedure is performed for each of two tones. To generate a DTMF sample, the two tone points are added; the sum is semilogarithmically encoded into 8 bits by the linear to MU-LAW converter 70 and is thereafter stored in the CODEC transmit buffer 74. DTMF tone frequencies at 697, 770, 852, 941, 1209, 1336, 1477 and 1633 may be adopted.

The transmit clock tracking loop 64 acts in conjunction with the line $DSP_1$ controller 62 to implement the transmit phase lock loop. This process locks the transmitted-symbol rate to the rate at which transmit data arrives from the line IOP 2. This is achieved, as shall be described in greater detail below, by checking the amount of data available in the "data in" buffer 88 and increasing or decreasing the rate for a relatively heavy or light buffer load.

When operating at 2400 bps, the modem transmitter 68 acts to convert each dibit (bit pair) of data to be transmitted into one of four phase shifts corresponding to the four possible values of the dibit. The phase shift so generated is added to an instantaneous angle which rotates one and one half cycles per symbol. Elapsed time is determined by the 7.2 khz sampling-interrupt rate which is related to the symbol period by the transmit phase lock loop. Under these conditions six sampling-interrupt periods define a time window of duration equal to a symbol period plus or minus a tiny fraction of a symbol period. This tiny fraction, which can be zero, is a function of the transmitted symbol-rate. Each symbol so generated is converted to a sinusoidal segment of 1/256-cycle resolution and a block three symbol periods in length is window weighted with a SIN (X)/X function. It is then overlaid on and added to its predecessor with one symbol-period intersymbol time displacement. This modulation technique is considered to be superior to one employing a fixed transmitted-symbol rate since it adapts by itself to an internal or external source of timing with no effect on echo canceler performance.

The echo canceler 80, as shall be described in greater detail below, acts to remove up to 5 ms of transmit echo via a Nyquist reference or sample by sample approach. During initial training the echo canceler full update processing is carried out once per frame. However, during actual message traffic, update processing may be reduced by taking correlation on a fraction of the available samples. The update process looks for correlation between a process sample, i.e. a receive sample with the echo estimate removed, and a sample transmitted up to 5 ms earlier. This correlation is done for each of 36 discrete delay times, each 1/7200-S apart. Any correlation is treated as residual echo. The filter weight corresponding to the delay in which correlation is found is updated in a direction to reduce residual echo.

The automatic gain control 82, as shall be described in greater detail below, acts to apply a gain factor to received samples such that their time average energy matches a desired reference. The gain factor is continually updated. When the gain factor approaches a value too large or too small, the AGC gain factor limits, and a dropout or overflow condition occurs. The hardware AGC pad is set just prior to echo canceler training and remains fixed for the duration of the transmission.

Dial tone detection is handled by the dial tone detect unit 86. When activated the dial tone detection unit 86 acts in the conventional manner to look for energy in the band from 300 to 800 hz. The dial tone detection unit 86 acts to determine what the total receive signal power is and what the 300 to 800 hz in band power is. The MU-LAW to linear conversion programs 70, 72 and 84 are conventional. The linear to MU-LAW conversion process semilogarithmically encodes a 14 bit linear value to an 8 bit value. Conversely, the MU-LAW to linear, conversion process converts a semilogarithmically encoded 8 bit value to a 14 bit value via a look up table.

The line receive digital signal processor 6 contains the receiver functions of the multirate modem apparatus according to the instant invention. The line receive digital signal processor 2 comprises a receive shared memory 100, a line $DSP_2$ controller 102, an interpolator 104, a baud-sync metric unit 106, a modem receiver 108, a digital buffer 110 and digital pattern search and data extraction macros 112.

The digital signal processor 6 determines when to invoke its subordinate processors. This is done as a function of the output of the interrupt handler 114 which is driven by the 7.2 khz output of the counter 52 as shown. The output of the interrupt handler 114 is supplied as shown to the line $DSP_2$ controller 102. In normal receive traffic data samples having echo removed which originate in the transfer out buffer 90 of the transmit digital-signal processor $DSP_1$ or 4 are supplied, as indicated, to the transfer in buffer 116 of the receive shared memory 100. This transfer occurs through the IOP 2 and more particularly the DSP I/O buffer 42 therein. The interpolator and baud-sync metric units 102 and 104 interpolate the samples and adjust the block sizes in a manner such that the received symbol rate matches the transmitted symbol rate of the far end terminal. The modem receiver 108 demodulates the samples which represent a digitized phase-shift keyed signal with a 36-complex-sample adaptive equalizer and produces two bits of output (dibits) for each demodulated signal. Demodulated bits from the modem receiver 108 are inserted into a digital buffer 110 for subsequent inspection by the pattern search and data extraction unit 112. Here patterns such as start of message and the like are detected and data is forwarded through cable 118 to the data out buffer 120 within the receive shared memory 100 for subsequent forwarding to the DSPI/O unit within the IOP. Message events such as start of message are detected by the pattern search and data extraction unit 112 are indicated to the line DSP controller 102 in the manner shown in FIG. 1.

The line $DSP_2$ controller 102 may take the form of a TI TMS 32020 processor chip which is exactly the same chip noted in connection with the line $DSP_1$ controller. The line $DSP_2$ controller 102 operates in much the same manner as its counterpart in the IOP and $DSP_1$ in that it processes messages and uses state and event tables to determine when to evoke its subordinate processes.

The interpolator unit 104 is basically an interpolation filter which acts to calculate what a receive sample value would be if the receive side of the CODEC were to be strobed up to one half of a 7.2 khz clock cycle early or late. A constant amount of earliness or lateness in phase is applied to a 5 ms frame of samples. This phase is updated once per frame. The baud-sync metric unit measures the baud alignment error by measuring the correlation of the 1800 hz carrier at 4 sample points corresponding to the beginning and end of the baud. To this end early windows and late windows are employed in the measurement as discussed in greater detail in connection with FIG. 12. When the baud transition begins to drift into one of the windows, the correlation in the opposite window on the average becomes stronger and the difference in energies of correlation provides an error signal.

The error signal provided by the baud-sync metric process is integrated with a first time constant to obtain a symbol frequency offset estimate and with a shorter second time constant for phase correction. The sum of the symbol-frequency offset estimate and the phase correction determines the rate of change of interpolator phase. When the interpolator phase in the 7200 hz clock cycle becomes less than $-0.5$ or greater than or equal to $+0.5$ then a value of $+1$ or $-1$ respectively is added to the interpolator phase and the filter alignment with respect to the samples is adjusted by $-1$ sample or 1 sample respectively. This approach is considered to be highly cost effective in that it saves the recurring cost of hardware logic to control a programmable interval timer at the expense of nonrecurring cost of software to interpolate the data.

During an absence of sufficient signal energy the baud-sync time constants are temporarily set to zero to avoid corruption of the baud error. In these instances the later symbol frequency offset estimate is used to "flywheel" through the updating of the interpolator phase.

The modem receiver shall be described in greater detail in connection with FIG. 13. Here, however, it should be recognized that the modem receiver 108 comprises a demodulator and an adaptive equalizer. The interpolator unit 104 provides as an input thereto 144 sample circular buffer (DEMODR) with an 18 sample history, which is loaded frame synchronously with 36 sample blocks from $DSP_1$ via the IOP.

The interpolator moves 3 samples per baud at 4800 bps or 6 samples per baud at 2400 bps from DEMODR to an onchip serial buffer (AESMP), which is shared by the interpolator, the modem receiver and the baud metric. The baud metric and servo controls the load point from DEMODR to AESMP, the interpolator tap values and the number of bauds to be processed this frame (5, 6 or 7 bauds at 2400 bps and 11, 12 or 13 bauds at 4800 bps). The interpolator shifts 3 or 6 samples per baud into AESMP and filters 3 or 6 samples to produce an interpolated sample buffer within AESMP and to maintain a baud boundary at the equalizer.

Once per baud the equalizer, which contains 36 complex taps, filters 36 samples in AESMP to produce quadrature outputs (X and Y). The quadrature outputs are converted to polar coordinates (R and $\phi$) and demodulated by a local phase lock loop in unit 108. The phase difference from the previous baud is quantized to one of four angles as shows in FIG. 11. Thereafter two bits of digital output are provided for every six samples of receive interpolated data.

The output of the modem receiver 108 is supplied to the digital buffer 110 as indicated in FIG. 1. The buffer data is thereafter supplied to the pattern search and data extraction unit 112.

The pattern search and data extraction unit 112 is utilized, as aforesaid, for data extraction purposes in the well known manner and to perform signal handshaking with the IOP. Thus when directed by the line $DSP_2$ controller 102 the pattern search and data extraction unit 112 searches the data stream for predetermined data patterns such as a start of message sequence or for purposes of validating a message indicator. When appropriate the pattern search and data extraction unit 112 raises an event or message event signal level which is supplied to the line $DSP_2$ controller 102 to cause a control message to be sent to the IOP of the line system.

Referring now to FIG. 2 there is shown a schematic diagram of actual hardware which may be employed in the embodiment of this invention illustrated in FIG. 1. The hardware illustrated in the schematic of FIG. 2 comprises an IOP processor 150, $DSP_1$ and $DSP_2$ processors 152 and 154, random access memories (RAM) 156–158, read only memories (ROM) 160–162, 8 bit data bus portions 164–170, address bus portions 172–175, a coder decoder (CODEC) 178, a programmable automatic gain control (AGC) unit 180, a programmable hybrid 182 and a telephone line interface 184. The IOP or input/output processor 150 may take the form of a Hitachi HD6301V1 processor. The IOP 150 is provided with a UART as indicated for the receipt and transmission of message information on the conductors annotated 186 and 188. Both the transmit and receive conductors 186 and 188 are provided with appropriate line drivers 190 and 192 to enable message information interfaced to the IOP at the UART connections thereof to be conveyed and received at appropriate logic levels. The IOP 150 is also provided with an appropriate oscillator 194 which may operate at the 7.3728 mhz rate indicated for the oscillator 10 in FIG. 1 or at an appropriate multiple or division thereof.

The data bus 164 of the IOP 150 as well as the address bus 172 thereof are each connected to RAM 156 and ROM 160 as indicated in FIG. 2. The RAM 156, as well as RAM's 157 and 158 associated with the $DSP_1$ and $DSP_2$ processors 152 and 154 may each take the form of conventional 16 k by 16 random access memories although in the case of RAM 156 all the storage available therein need not be utilized. Similarly, the ROM 160, as well as ROM's 161 and 162, may each take the form of 16 k by 16 ROM devices which here are employed to store program memory for each of the processors 150, 152 and 154 associated therewith. RAM's 157–158 and ROM's 161–162 are provided to complement the onboard memory available in each of the processor chips 150, 152 and 154.

The address bus 172 of the IOP 150 is also connected to the ROM and RAM devices 160 and 156. The address bus 172 is 16 bits wide and is split, as indicated in FIG. 2, so that conductors A15-8 thereof are directly connected to the IOP 150 while the lower order 8 bits $A_0$–$A_7$ are latched through a conventional 8 bit latch 196. A programmable array logic (PAL) 198 is also connected to the address bus 172 and more particularly bit conductors A15–A12 therein. The lower order 8 bits of the address bus 172 and the 8 bits of the data bus 164 are combined on the multiple conductor cable 200 where the same are connected to a programmable interface adapter (PIA) 202 whose output is utilized to provide 24 input/output lines as indicated. Additionally, the multiconductor cable 200 is connected to a conventional SSDA unit 204 for the receipt and application of message information to external system outputs.

Both the data bus 164 and the address bus 172 of the IOP 150 are connected to the data bus 165 and the address bus 173 for the $DSP_1$ processor 152 through a conventional interprocessor driver and control device 208. Similarly, the address bus 172 and data bus 164 of the IOP are connected through the multiconductor cables 170 and 175 to an interprocessor driver and control device 210 which couples the address bus 172 and the data bus 164 of the IOP to the address bus 174 and the data bus 166 of the $DSP_2$ processor 154. The interprocessor, driver and control devices 208 and 210 take the form of conventional interprocessor control devices which act in the well known manner to interconnect control lines, data lines and address lines of processors and, where appropriate, manipulate signal values involved to appropriate logic levels. Each interprocessor driver and control device 208 and 210 is provided as shown with programmable array logic (PAL) so that the same may receive and provide inputs and outputs to external sources indicated by IO devices 212 and 214.

Both the DSP₁ processor 152 and the DSP₂ processor 154 may take the conventional form of TI TMS 32020 processors such as currently available from Texas Instruments Corporation. The DSP₁ processor 152, as shall be recalled, performs the function of a transmitter, echo canceler, automatic gain control and tone detector within the instant embodiment of the multirate modem according to the instant invention while the DSP₂ processor provides the receive functions and attendant adaptive equalization.

The data bus 165 and address bus 173 of the DSP₁ processor 152 are each connected to the random access memory 157 and the read only memory 161. The random access memory 157 serves in the role of a data memory while the read only memory 161 functions as the program memory for the DSP₁ processor 152. The address bus 173 for the DSP₁ processor 152 is again 16 bits wide and is connected to an IO device 216 to enable 16 bit address information to be received and provided to external devices. Similarly, the data bus 165 is connected to IO device 218 so that data may be communicated to and received from external devices. The data bus 165 is also connected through a data flipflop 220 to allow data to be loaded onto the data bus portion 167.

In precisely the same manner as described for the DSP₁ processor 152, the DSP₂ processor 154 has its address bus 174 and data bus 166 connected to a data memory 158 which takes the form of a RAM device and a program memory 162 in the form of a read only memory device. The address bus 174 is connected to IO device 222 to permit address instructions to be received and conveyed to external devices while similarly the data bus 166 is connected to IO device 124 to achieve the same purpose.

The data bus 167 is connected to data portions 168 and 169 for purposes of communicating with the telephone company interface 184 and the programmable hybrid 182. The telephone company interface 184, as indicated in FIG. 2, is a conventional interface connected to tip and ring in the manner indicated as well as to conventional power on and ring detector circuitry indicated by the blocks 226 and 228. The block 226 determines whether or not power is coupled to the interface and hence whether the same is active while the ring detector 228 is in all ways conventional. The output of the ring detector 228, as generally indicated in FIG. 2, is connected to the IOP 150.

Message information received from the telephone interface 184 is coupled through a conventional driver 230 to the programmable AGC device 180. The programmable AGC device 180 shall be further described below. Here, however, it is sufficient to appreciate that the gain of signal information obtained from the interface 184 is raised to an appropriate level as a function of controlled information present on the control conductors 232 and 234 connected to the data bus 168. The analog output of the programmable AGC unit 180 is supplied to the CODEC unit 178 where the same is coded in the conventional manner and output on the conductor 236 as a pulse code modulated output which is supplied to an appropriate input of the DSP₁ processor 152. Signal information to be transmitted is applied from the DSP₁ processor through the conductor 238 in the form of pulse code modulated information whereupon the same may be decoded by the CODEC unit 178 into an analog output which is supplied to the programmable hybrid 182 and thereafter to the telephone interface 184.

The CODEC unit 178 may in all ways be a conventional PCM coder/decoder unit and as such is provided with appropriate clock inputs in the manner indicated. The output of the CODEC unit 178 on conductor 240 is supplied to both an amplifier stage 242 and a DTMF tone generator unit 244. Here, depending upon the nature of the analog output of the CODEC unit on conductor 240, message information will either be supplied through the programmable hybrid 182 to the telco interface or appropriate tone pairs, as generated by the DTMF tone generator unit 244, will be generated as a function of control information provided on the data bus 169. Similarly, the programmable hybrid 182, which in all ways corresponds to a conventional hybrid employed in telephone communications, receives 4 bits of control information from the data bus 169. The control information for the DTMF unit 244 and the programmable hybrid 182 is supplied, as shall be seen in greater detail below, as a function of data output by the DSP₁ processor 152.

While the hardware design set forth in FIG. 2 has defined specific hardware arranged in preferred multiprocessor arrangements, those of ordinary skill in the art will readily appreciate that other configurations may be employed. For example, other processor types, more or less memory and different arrangements for parallel and for multiple processing may be utilized.

Figure 3:
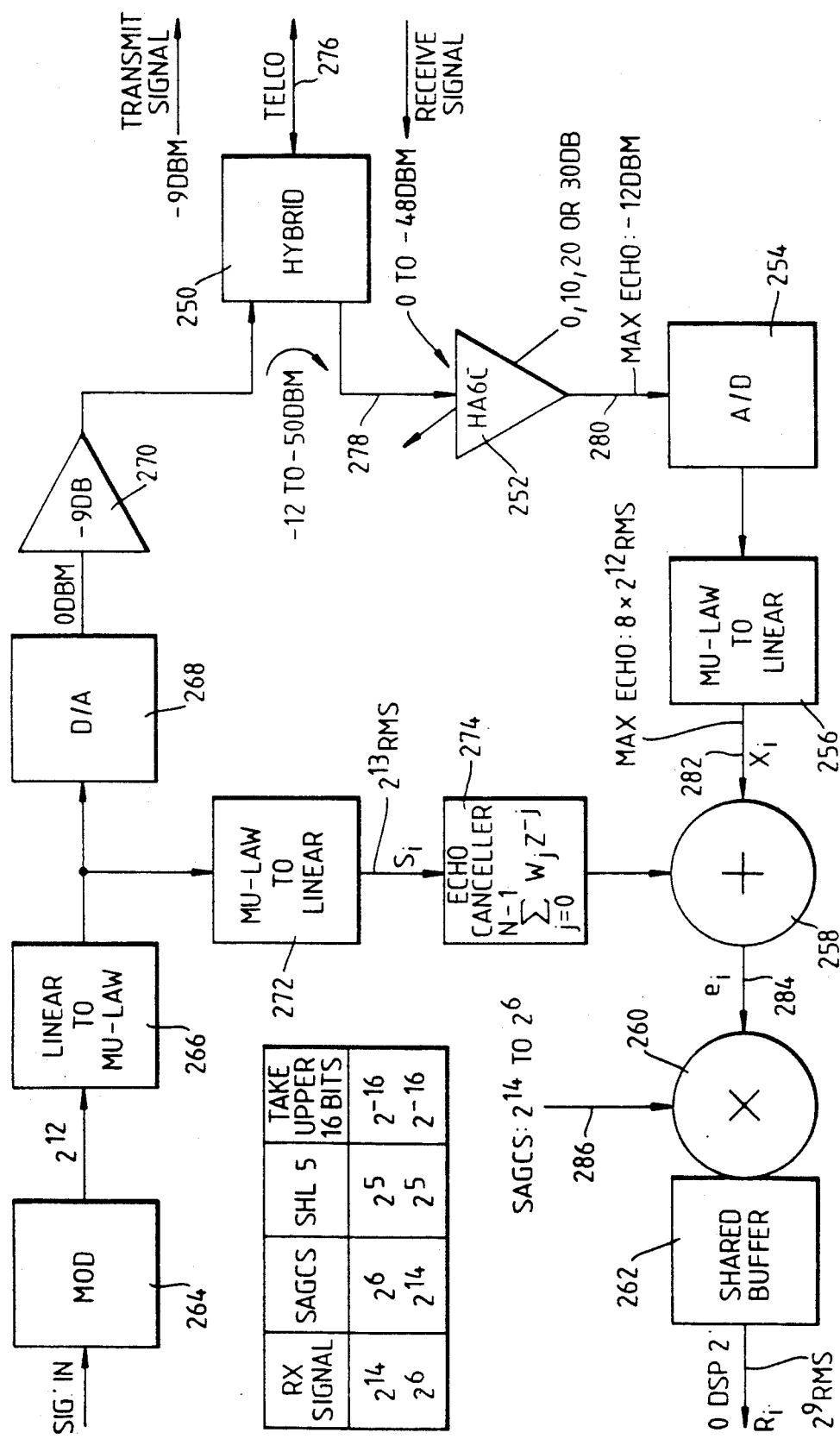
FIG. 3 is a signal processing diagram indicating the details of the programmable automatic gain control (AGC) shown in FIG. 1.

Referring now to FIG. 3 there is shown a signal processing diagram indicating the details of the automatic gain control (AGC) implemented in accordance with the teachings of the instant invention. As will be apparent to those of ordinary skill in the art, from the description of FIGS. 1 and 2 set forth above, automatic gain control is implemented within the instant invention with both hardware and software aspects. Thus, as was shown in FIG. 1, the digital signal processor DSP₁ includes processor implemented automatic gain control as indicated by the block 82. Similarly, as shown in FIG. 2, a programmable automatic gain control circuit 180 is employed in association with the telco interface 184 and the programmable hybrid 182. Furthermore, as indicated by the conductors 232 and 234 in FIG. 2, the programmable AGC 180 is controlled by the digital signal processor DSP₁ through the data bus 167 and 168.

Figure 4:
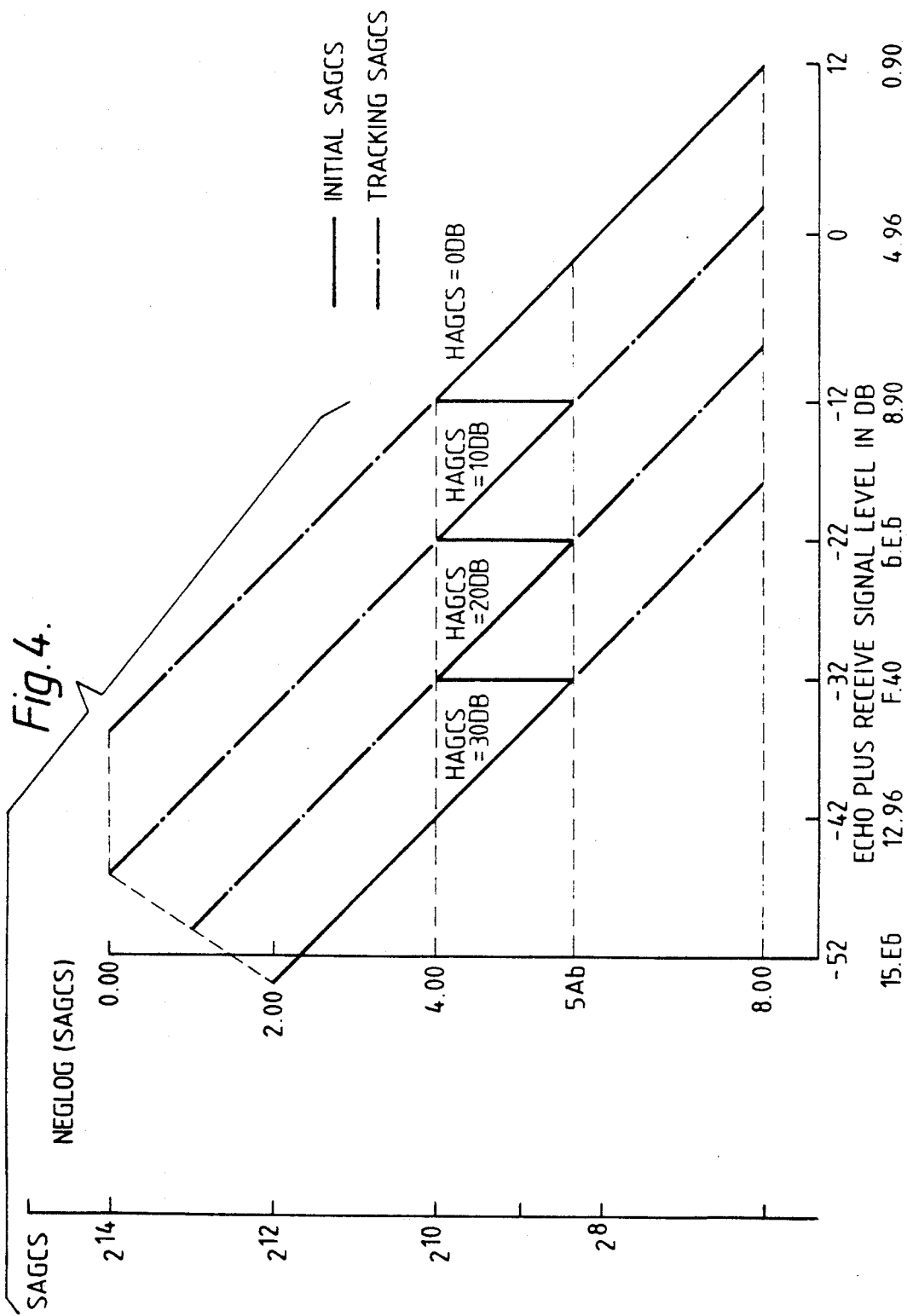
FIG. 4 illustrates the hardware and software AGC scale factor imposed by the AGC.
Figure 5:
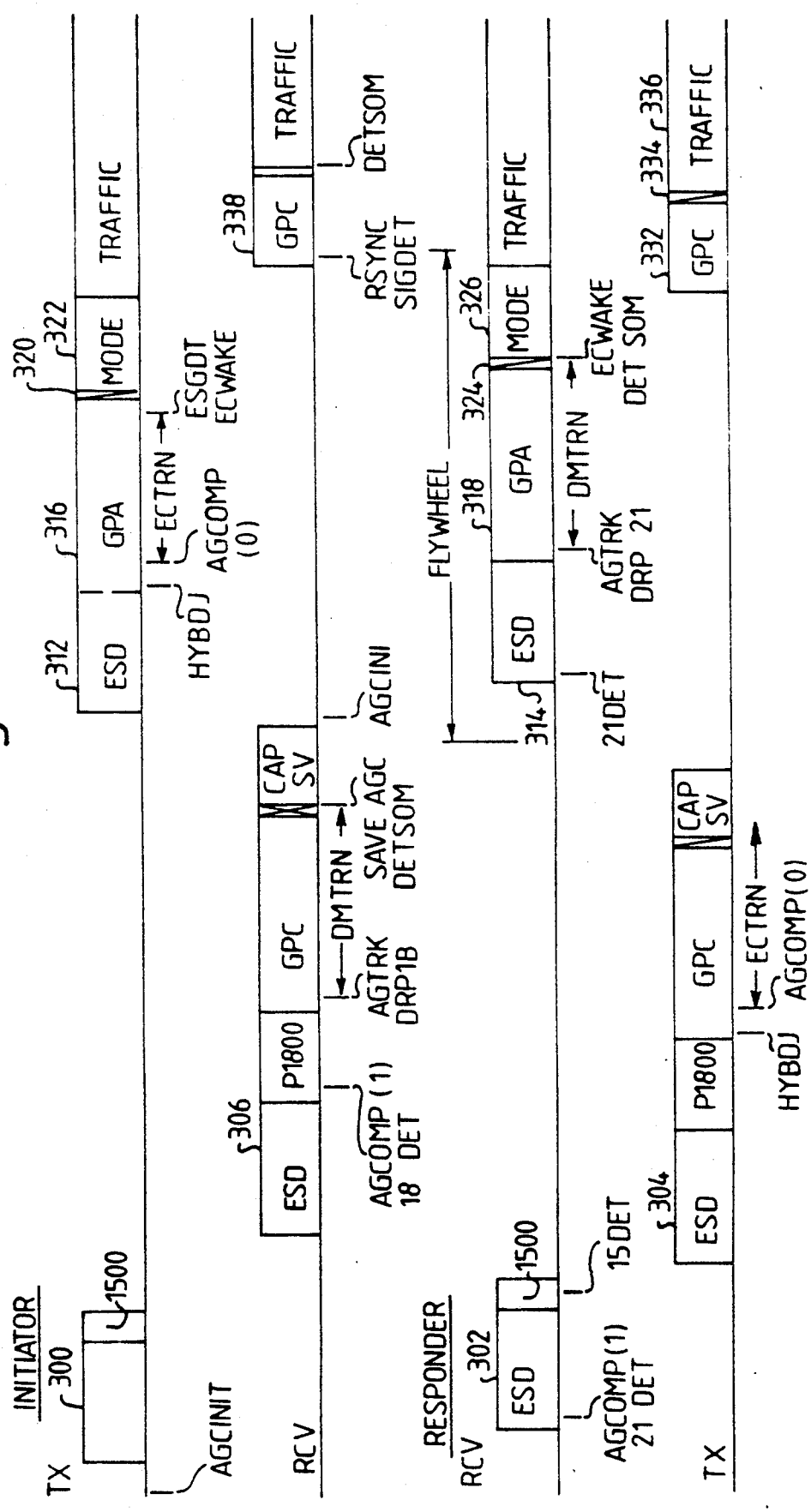
FIG. 5 illustrates the two wire modem transmission protocols.
Figure 6:
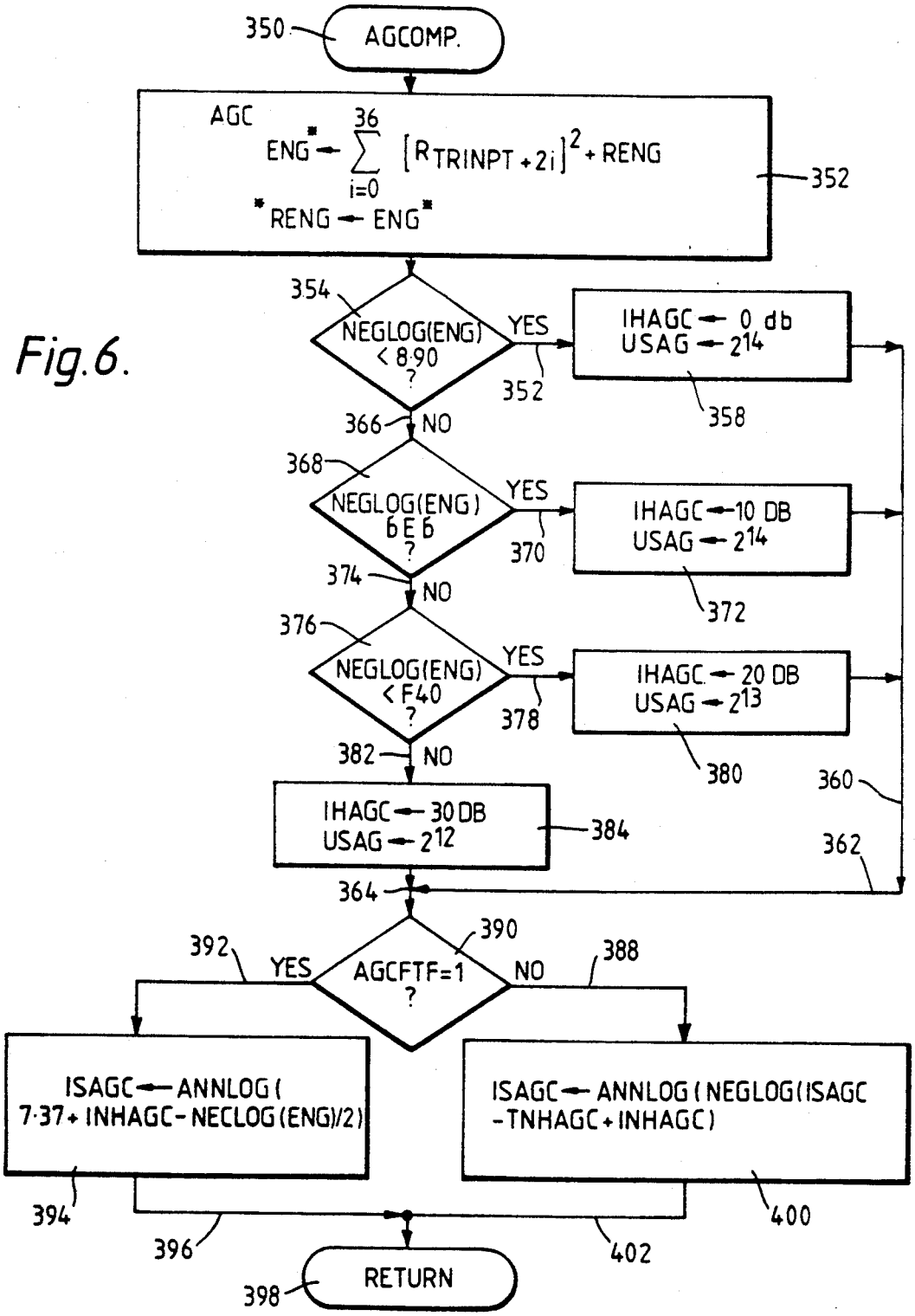
FIG. 6 is a flow chart showing an exemplary AGC initialization routine employing negative logarithms.

The manner in which AGC is implemented as a result of the control exercised by the digital signal processor DSP₁ is set forth in connection with both software and hardware aspects in FIG. 3. In addition, the description of FIG. 3 will periodically make reference to FIGS. 4–6 wherein FIG. 4 illustrates the software AGC scale factor imposed by the AGC on the programmable AGC circuit 180. FIG. 5 is a time line diagram indicating the manner in which AGC training or settings are established between a transmitting (initiator) and receiving (responder or follower) pair of modems while FIG. 6 is a flow chart demonstrating the manner in which values for setting the programmable hardware AGC 180 are established.

Turning to FIG. 3 it will be seen that the reception side of the network includes a hybrid 250, a hardware AGC circuit 252, an A-D converter 254, a MU-LAW to linear converter 256, a summing junction 258, a gain factor multiplier 260 and a shared buffer 262. The transmission side of the network includes a modulator 264, a linear to MU-LAW converter 266, a D-A converter 268 and an amplifier 270 for inserting −9 db of attenuation. The transmission side of the network is connected to the reception side of the network through a MU-LAW to linear converter 272 and an echo canceler 274.

The hybrid 250 corresponds to the programmable hybrid 182 as shown in FIG. 2 and takes the conventional form of a programmable hardware device typically used to interface two-wire and four-wire circuits in data communications. For a full duplex data set interfaced to a two-wire circuit an adjustable hybrid is required to minimize the near end echo through hybrid resistive matching. By coupling the programmable hybrid 250 to a signal processor such as $DSP_1$, the hybrid can be automatically adjusted. Implementation of an automatic hybrid adjust capability by the digital signal processor $DSP_1$ involves the use of an algorithm to effect signaling in the four bit hybrid control line as plainly indicated in FIG. 2. Specifically, bit positions 3—6 on the data bus 169 originating from digital signal processor $DSP_1$ are used as a four bit input to the hybrid as is also indicated in FIG. 2. The resulting signals HYB 1-HYB 4 are applied as latched outputs to a quad analog switch which switches the hybrid 250 through a plurality of parallel resistive paths designated as step 1-step 4. The resulting variable resistance is available in 16 discrete steps to balance the full range of 300–1200 ohm loads at the telephone company interface. Receive signals from the telco interface, as indicated on conductor 276, are applied by the hybrid 250 through the conductor 278 to the hardware AGC circuit 252.

The hardware AGC circuit 252 corresponds to the programmable AGC 180 shown in FIG. 2 and as indicated is a conventional variable attenuation device capable of selectively inserting 0 db, 10 db, 20 db or 30 db of gain into a signal passing therethrough. The amount of gain inserted by the hardware AGC 252 is controlled by signals issued by the digital signal processor $DSP_1$ through the data bus 167 and 168 and imposed upon control lines 232 and 234 as shown in FIG. 2.

The output of the hardware AGC circuit 252 is supplied through conductor 280 to the A-D converter 254. The A-D converter 254 resides within the coder/decoder 178 in FIG. 2 and acts in the conventional manner to translate analog signal received from the telephone line into digital signals. It is important to keep in mind that in the adjustment sequence to be described it is desired that the output of the A-D converter 254 be made as strong as possible while avoiding saturation thereof. The A-D converter 254 typically converts analog values received thereby into 14 bit linear values.

The output of the A-D converter 254 is supplied as indicated in FIG. 3 to the MU-LAW to linear converter 256. The MU-LAW to linear converter 256 corresponds to the MU-LAW to linear converter 84 illustrated in FIG. 1. In this role the MU-LAW to linear converter 256 functions to semilogarithmically encode a 14 bit linear value as typically received from the AD converter 254 to an 8 bit value. This is a software generated function which operates essentially as a function of a look-up table.

The output of the MU-LAW to linear converter 256 is supplied through conductor 282 to the summing junction 258. The summing junction 258 is part of the echo canceler 80 illustrated in FIG. 1 and effectively acts to sum the converted output of the hardware AGC 252 with an echo cancellation signal as generated by the echo canceler 274. The output of the summing junction 258 is supplied through conductor 284 to the gain factor multiplier 260. The gain factor multiplier 260 receives a software generated scale factor (SAGCS) which may vary from $2^{14}$ to $2^6$. This will correspond to receive signals whose energy varies from +12 dbm to −42 dbm for the range of scale factors set forth. The resulting value from the gain factor multiplier 260 is shifted five times to the left and thereafter loaded into a shared buffer 262 where the same may be read by the IOP and supplied to the $DSP_2$. The shared buffer 262 would correspond to buffer 90 in FIG. 1.

As shall be seen in greater detail below, when a signal is initially received at the hybrid 250 the hardware AGC 252 is set to a value of 0 dbm and the SAGCS input on the conductor 286 is set at $2^9$. The power of the signal loaded into the shared buffer 262 is then calculated by the software taking the sum of the squares thereof and depending upon the value of the power obtained an intermediate value for the hardware AGC 252 is established.

For example, referring to FIG. 4 it will be seen that the value of echo plus receive signal level in db is plotted along the abscissa as well as the negative log thereof. Similarly, the values of SAGCS are plotted along the ordinate as well as the negative log of these values. Further, a set of curves are plotted representing the value set for the hardware AGCS 252 in terms of the discrete setting thereof so that a sawtooth is achieved.

The function of the software in obtaining an intermediate value initially for setting the hardware AGC 252 may thus be implemented in the following manner. With the AGC set to 0 db and the value of SAGCS set to $2^9$ the energy of the receive signal is measured by taking the sum of the squares of the signal loaded into the shared register 262. If, for example, that signal turns out to be −6 dbm, the initial setting of 0 db for HAGCS is maintained. However, if the value should be −27 dbm, the software would change the value set for HAGCS to 20 db through use of a look-up table for providing an intermediate value of HAGCS where the received energy, as measured on the abscissa, corresponds to the value on the sawtooth for a value of SAGCS on the ordinate. This is done with the echo canceler 274 effectively out of the circuit. Once an appropriate value of HAGC is obtained and an intermediate value on SAGCS has been calculated, the signal is loaded into the shared buffer 262 and is employed by the digital signal processor $DSP_2$ to enable the same to train and more particularly train the equalizer, etc., therein. (Initiator case in FIG. 5).

After the digital signal processor $DSP_2$ has been trained, as outlined above, the modulator 264 in FIG. 3 would issue an echo suppression disable tone (2100 hz). This signal would be translated by the linear to MU-LAW converter 266 into an 8 bit value and supplied to the digital to analog converter 268. The resulting value would be attenuated by the amplifier 270 and supplied to the hybrid 250 for transmission at the telco interface as indicated by the conductor 276. The hardware AGC is then adjusted based on the sum of the echo passed through the hybrid and the energy received from the remote transmitter. The software multiplier is then adjusted to compensate for any change in HAGCS.

In actuality, the procedure involved is somewhat more complex it that a calling modem or initiator and a called modem or responder would both be involved and each would conduct initial settings of the hardware AGC 252, the software AGC signal (SAGCS) and training of the digital signal processor $DSP_2$ within corresponding intervals. Furthermore, as shall be seen in greater detail below, setting of the echo canceler would also take place.

Referring now to FIG. 5 the hand shaking sequence wherein values of HAGCS, SAGCS, training of $DSP_2$, etc. between a pair of modems, according to the instant invention, initiating communication is set forth. More particularly, the overview set forth in FIG. 5 is a time line for the initial interaction between the initiator and responder modems according to the protocol established. In FIG. 5 a high level description of sequences of initiator and responder actions are set forth. Further, it will be noted in FIG. 5 that marked along the ordinate are transmit actions TX and receive actions RC for both the initiator and follower modem. Thus, it will be understood that receive actions for the initiator are associated with training of the digital signal processor $DSP_2$ therein while transmit actions of the follower are associated with digital signal processor $DSP_1$.

Accordingly as shown in FIG. 5 in the initiator sequence, as indicated by block 300, the HAGCS 252 in FIG. 3 is set to its 0 db setting. Thereafter an echo suppressor disable (ESD) tone of 2100 hz is sent followed by a 1500 hz tone. The initiator then waits for an 1800 hz tone from the responder or times out after 3.3 seconds. When a time out occurs a return to an idle state under program control occurs and a no response error message is issued. As a first step in the responder sequence, as indicated by the block 302, the HAGC 252, as shown in FIG. 3, is first set to 0 db. After detection of the ESD tone through the use of the formula NEGLOG (ESD energy) minus NEGLOG (total energy) greater than $-3$ db, the detected ESD energy value is saved and a preliminary value for SAGCS is established using ANTINEGLOG functions. When the 2100 hz tone drops out the 1500 hz tone is detected indicating an initial ESD. Thereafter, as indicated by the block 304, ESD tone is returned followed by an 1800 hz tone. At the initiator, as indicated by the block 306, the 1800 hz tone is detected. The 1800 hz energy value is employed to calculate an intermediate value for setting HAGCS and SAGCS.

Back on the responder side of the time line, as indicated by the block 304, the responder transmits a scrambled (GPC) sequence after 150 millisecond. of P1800 hz. The responder then adjusts its hybrid to minimize the return echo. Following the hybrid adjust the responder measures the return energy and computes the SAGC and HAGC values. With the final hardware AGC setting (HAGC) in place the responder trains its echo canceler. The scrambler sequence continues for 650 milliseconds. Thereafter, as indicated by the block 304, a capabilities message is transmitted (see CAP/SV in FIG. 5).

Back on the initiator side of the time line, as indicated by the block 306, once a dropout of the 1800 hz tone is detected via NEGLOG (1800 hz energy) less than NEGLOG (1800 hz detect energy) $-6$ db, the AGC servo is then allowed to run and the receiver is trained for 120 frames on the random ones ($SCR_c$ "1") being sent by the responder. The 120 frames include time to find the initial baud-sync position and to train the equalizer and phase lock loop. Following receiver training the capabilities message is read. At the end of the receiver training session the value of SAGCS and the intermediate value of HAGC are saved for later use. Thereafter the equalizer is frozen and the phase locked loop and baud sync loop are allowed to flywheel (i.e. they are allowed to advance by the carrier and rate offsets trained into the servos. The initiator then waits 10 frames, sets HAGCS to 0 db and sends ESD for 80 frames or 400 ms as indicated by the block 312.

On the responder side of the time line, as indicated by the block 314, the ESD tone being transmitted by the initiator is detected through the use of the formula NEGLOG (ESD energy) greater than NEGLOG (ESD detect energy) plus NEGLOG (final HAGCS gain) minus 6 db. The SAGCS is allowed to adapt.

On the initiator side of the time line, once ESD has been sent for 80 frames, scrambled ones ($SCR_A$ "1") are sent for 130 frames as indicated by the block 316. A second hybrid adjust is implemented to minimized the return echo. Echo energy is measured, echo energy plus 1800 hz energy is calculated and a final HAGC value is computed for the initiator side. The final and intermediate HAGC values and previous SAGCS value are employed to calculate the final SAGCS. The echo canceler is then trained for 100 frames in a manner to be described below.

On the responder side of the time line, as indicated by the block 318, the dropout of the 2100 hz ESD tone is detected through the formula NEGLOG (ESD energy) less than NEGLOG (ESD detect energy) plus NEGLOG (final HAGCS gain) $-6$ db. Thereafter, as indicated by the block 318, the previous AGC values (SAGCS, HAGCS) are loaded and the receiver on the responder side is trained for 120 millisecond. with the AGC servo running, wherein these 120 frames include time to find the initial baud-sync position. During receiver training, the software the AGC servo is run and SAGCS is adapted.

At the initiator side of the time line data transmission, as indicated by the blocks 320 and 322, the operating mode message is transmitted, prefixed with a start of message character as indicated by the block 320. At this juncture the echo canceler is running with finely adjusted taps and the receiver is enabled for subsequent detection of signal. In addition to the start of message (SOM) character the data transmitted, as indicated by blocks 320 and 322, include mode data, i.e. whether 2400 or 4800 bps transmission is available as well as additional handshaking information.

At the responder side of the time line, as indicated by the blocks 324 and 326, after training for 120 frames has been completed data reception is initiated, the equalizer is allowed to adapt in the run mode and baud-sync frequency offset tracking continues from the training interval. In addition, as indicated by the blocks 332, 334 and 336, the responder transmits a short GPC followed by data transmission, including a start of message (SOM) character, as indicated by the block 334.

On the initiator side of the time line the receive section, as indicated by the block 338, detects energy and begins execution of a resync cycle. The AGC tracking loop is restored, the baud servo and phase-lock loop are run first order (no feedback to rate offsets). Following the resync interval the phase-lock loop, baud servo and equalizer adapt routines are turned on and data is demodulated in full duplex as indicated by the block 336 and the beginning of 338. Following transmission of GPA on the initiator side or receipt of same on the responder side, a slow echo canceler tap update is initiated (See FIG. 5 ELWAKE).

On either side of the time line dropout is detected in one of two ways, i.e. either energy ENG less than (target energy) divided by 4 for a signal which rapidly drops below the current energy level or by SAGCS greater than 2 times the value of the saved SAGCS value which occurs for a signal which slowly drops below its value at the end of the receiver initial training session. When dropout is detected an idle state is initiated and a dropout message is issued. The exact same form of dropout detection occurs at the responder.

Thus it is seen that the automatic gain control (AGC) computes initial settings for the hardware gain (HAGC) and the software scale factor SAGCS. The hardware AGC is set so as to assure that the receive signals with peak power less than 12 dbm will not overdrive the CODEC A/D converter. The hardware setting also assures that the return echo level will be less than $-2$ dbm which converts to $2^{12}$ rms at the echo canceler. Canceler tap weights shall lie in the range of $2^6$–$2^{14}$. The software scale factor, SAGCS, is initiated to yield a $2^9$ rms level at the $DSP_1$ to $DSP_2$ transfer buffer for broad band modem signals. SAGCS is set to about 3 db high to assure an initially declining response to the AGC servo. In combination with demodulater training, this has been found beneficial. At either side (Initiator or Responder), initial adjustments are made in two stages, first on a remote signal and later on the local echo. After the initialization process is completed a tracking loop is activated to maintain the software scale factor. The tracking loop also contains a dropout detection function. The AGC performs level base signal detection during initiator training to detect the second occurrence of the receive signal.

The two stage initialization is carried out by the AGC compute subroutine, which is illustrated in FIG. 6. The routine is initiated by the digital signal processor $DSP_1$. The AGC compute routine illustrated in FIG. 6, as indicated by the oval flag 350, is called when the remote signal is detected (2100 hz at the first responder, 1800 hz at the initiator). The AGC compute routine calculates values for setting the HAGC 252 and the SAGCS signal 286.

Prior to the first entry of the AGCOMP routine at oval flag 350, RENG = 0 and AGCFTF = 1, the program computes ENG equal to the sum of the squares of 36 samples in a 5 millisecond frame. The energy is stored in RENG (remote energy) and the NELOG (ENG) is compared to the levels indicated in FIGS. 3 and 6. From these levels a hardware AGC setting is derived (see decision blocks 354, 368, 376 and IHAGC setting blocks 358, 372, 380 and 384. An initial software scale factor ISAGCS is then computed as a function of IHAGC and ENG (see block 394). On the second call to AGCOMP (i.e. during transmission of a scrambled sequence), the echo level is measured following hybrid adjust. This level is added to the receive energy (see block 352) and the hardware AGC scale is computed again. The software scale factor is then adjusted as a function of the hardware scale factor for remote energy INHAGC and the factor for the sum of echo and remote energies (IHAGC). See block 400. AGCOMP is run with the hardware AGC set at 0 dbm and SAGCS = $2^9$. AGCOMP does not load values into the AGC, it only computes them. This is done, as indicated by the rectangle 352, by taking the sum of the squares of the samples stored in the $DSP_1$ to $DSP_2$ transfer buffer 262. The receive energy, RENG, is added to the computed frame energy and the negative logarithm (NEGLOG) is taken. Thus, NEGLOG (ENG) equal NEGLOG (frame energy plus RENG) wherein RENG corresponds to the calculated energy received during the last frame and may be zero such as when this is a first calculation for a given receive signal. It should be noted that the responder runs the AGCOMP routine after it detects an ESD tone from the initiator so that the modem may gather data on the receive signal. When the responder transmits its return sequence it runs the AGCOMP routine a second time and finalizes the AGC settings. During the initial running of the AGCOMP routine the initial AGC settings, as mentioned above, of SAGCS equals $2^9$ and HAGCS equals 0 db are utilized.

After the AGCOMP routine computes the energy over one frame, in the manner indicated by the rectangle 352, the negative log of this value is tested in the manner indicated by the diamond 354 to ascertain whether or not the same is smaller than 8.96. If the negative log of the calculated energy is less than 8.96, as indicated by the arrow 356 annotated yes, the HAGC 252 and the signal value for SAGCS are set to their upper limit values of 0 db and $2^{14}$, respectively, in the manner indicated by the rectangle 358. The location of these upper limits may be seen in FIG. 4. Once this is done the program returns, as indicated by arrows 360 and 362, to a location in the program annotated 364.

If the negative log of the energy is not less than 8.96, as indicated by the arrow 366 annotated No, the program next tests, in the manner indicated by the diamond 368, whether the NEGLOG of the energy is less than BEB (hexidecimal notation). If the value of the negative logarithm of the energy is less than BEB, as indicated by the arrow 370 annotated Yes, the value of the HAGC and SAGCS signals are set in the manner indicated by the rectangle 372. More particularly, under these circumstances the value of attenuation for the HAGC 252 in FIG. 3 is set to 10 db, as indicated within the rectangle 372, while the SAGCS value is set at $2^{14}$. This, too, represents a limit setting at least for the SAGCS signal, as plainly indicated in FIG. 4. Thereafter, as indicated by the arrows 360 and 362, a return to the point in the program annotated 364 is initiated.

If the negative log of the energy is not less than BEB, as indicated by the arrow 374 annotated No, the program next tests, in the manner indicated by the diamond 376, whether the negative logarithm of the energy is less than F40 (hexadecimal). If the value of the negative logarithm of the energy is less than F40, as indicated by the arrow 378 annotated Yes, values for HAGC and SAGCS are set in the manner indicated by the rectangle 380. Thus here the value of HAGC is set to 20 db and the value of SAGCS is set to $2^{13}$. This too represents a limit setting as may be appreciated upon an inspection of FIG. 4. The program then returns, as indicated by the arrows 360 and 362, to the location annotated 364.

If the value of the negative log of the energy is not less than F40, as indicated by the arrow 382 annotated No, the value of HAGC and SAGCS are set in the manner indicated by the rectangle 384. Thus, here HAGC is set to 30 db and SAGCS is set to $2^{12}$, again representing a limit setting on the HAGCS equal 30 db line as plainly indicated in FIG. 4.

Once the values of HAGC and SAGCS have been set to one of the sets of limits indicated by the rectangles 358, 372, 380 or 384, the program initiates a test indicated by the diamond 390. More particularly, the test indicated by the flag 390 tests to ascertain whether or not the AGC first time flag is set indicating that this is the first time through the AGC Comp routine representing a first detection of the ESD tone. If the first time flag is not set then the software scale factor is based upon both the previous factor and the change. If it is set it is based on certain preliminary settings which are to be subsequently refined.

More particularly, if the AGC first time flag is set or equals zero, as indicated by the arrow 392 annotated Yes, the value of the SAGCS is reset to a value corresponding to the antilog (7.37+INHAGC−NEGLOG(ENG)/2). Here INHAGC represents a set of reference values for the software AGC scale. The value calculated for ISAGC is stored for subsequent loading and use as a value for SAGCS. Once the value for SAGCS is calculated, in the manner indicated by the rectangle 394, a return to the calling routine is initiated in the manner indicated by the arrow 396 and the oval flag 398.

When the AGC first time flag is not set, as as indicated by the arrow 398 annotated No, the value of SAGCS is calculated in the manner indicated by the rectangle 400. More particularly, here the value of SAGCS is calculated by taking the antilog in the manner indicated in rectangle 400. TNHAGC is a reference value from a chart for the first time hardware setting. The value INHAGC corresponds to the difference between the magnitude in the sum of the powers presently calculated and that previously calculated. Thereafter, a return to the calling routine is initiated in the manner indicated by the arrow 402 and the over flag 398.

Figure 7:
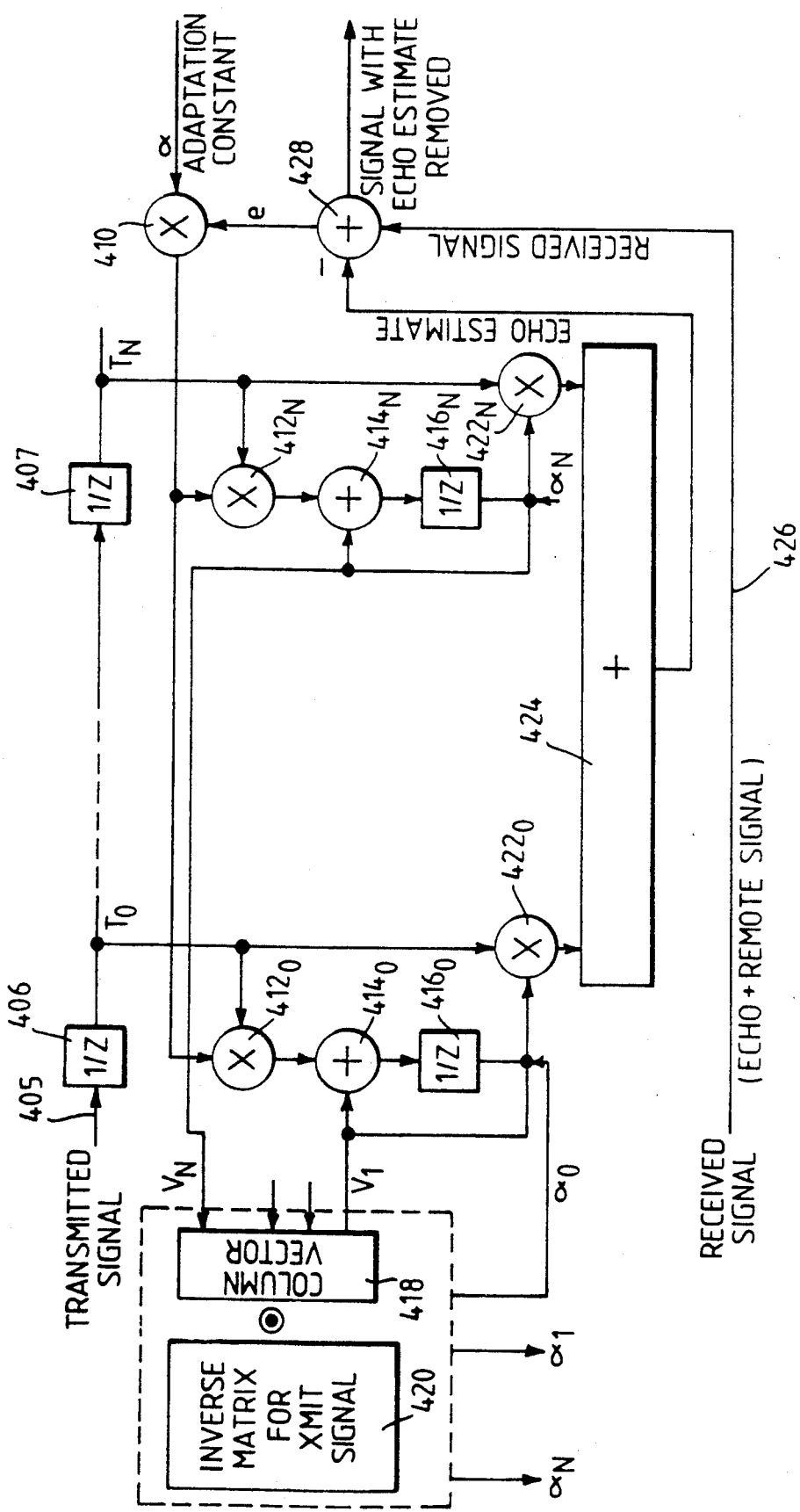
FIG. 7 is a signal processing diagram indicating the manner in which a first embodiment of echo cancellation apparatus according to the instant invention may be implemented under software control.

Referring now to FIG. 7 there is shown a signal processor diagram indicating the manner in which a first embodiment of echo cancellation apparatus, according to the present invention, may be implemented under software control. After the second ESD has been transmitted at the initiator (see FIG. 5, block 312) or after the P1800 hz tone has been transmitted at the responder, (blocks 304 and 308 in FIG. 5), the digital signal processor DSP$_1$ is then instructed by the IOP to adjust the telephone hybrid to minimize the return signal and to finalize the AGC settings as described above. Following these adjustments the IOP issues an echo canceler train command. At this juncture echo cancellation, in the manner indicated in FIG. 7 is implemented.

The embodiment of the echo canceler illustrated in FIG. 7 is implemented under software control and acts to remove up to 5 ms of transmit echo via a Nyquist-reference or sample by sample approach. During initial training the cross correlation between a 36 sample history of the transmit signal and the receive signal is taken over a 100 frame interval. The cross correlation vector is subsequently multiplied by an inverse to the transmit auto-correlation matrix, and the resultant vector is loaded into the canceler taps (alpha$_1$ ... alpha$_n$). During updating the cross correlation is between the canceler error and the transmit signal and feedback gain (ECFBGN) is reduced (i.e. only a fraction of the values from the inverse matrix multiplication are added to the previous tap values). The update process looks for correlation between a processed sample, i.e. a receive sample with the echo estimate removed, and a sample transmitted up to 5 ms earlier. The correction is done for each of 36 discrete delay times 1/7200-S apart. Any correlation is treated as residual echo and the filter weight corresponding to the delay in which the correlation is found is updated in a direction to reduce residual echo.

As illustrated in FIG. 7, transmitted signal is supplied on delay line 405 to each tap location V$_1$-V$_n$ with a one sample delay indicated by the blocks 406 and 407 being inserted between each tap. An adaptation constant ECFBGN is supplied as gain to the gain factor multiplier 410 as is a signal e which corresponds to the output of the echo cancellation circuit illustrated or a signal corresponding to the receive signal with the echo estimate removed. It should be noted at the outset that operation of the echo cancellation circuit illustrated in FIG. 7 will typically be initiated with the adaptation constant EGFBGN equal to 1 and thereafter ECFBGN will be modified to fractional values for purposes of improving echo cancellation. Thus, for a first pass ECFBGN equal to 1 may be employed while for the second pass a typical value of $\alpha$ may be $\frac{1}{4}$. Since the echo cancellation circuit illustrated in FIG. 7 typically yields a result corresponding to 20 db down the first pass with a slow improvement to about 36 db after many succeeding passes, those of ordinary skill in the art will recognize that convergence is sufficient so that under typical operating conditions the loop indicated in FIG. 7 will be sufficient for most applications.

The output of the gain multiplier 410 is supplied to correlater multipliers $412_0$-$412_n$ associated with each top $T_0$-$T_n$ as is the sample delay transmitted signal supplied to the tap. This signal is summed by a summing junctions $414_0$-$414_n$ with an output from a one sample delay $416_0$-$416_n$ for that tap which corresponds column vector 4 that tap. The resulting sum yields the cross correlation of the transmit signal at the tap involved.

The column vector associated with the taps V$_1$-V$_n$ is also applied to a column vector register 418. The dot product of the column vector values for each tap as present within the register 418 with an inverse matrix for the transmit signal, is as indicated by the block 420 yields an echo cancellation filter $\alpha_0-\alpha_n$.

The output of each gain multiplier $422_0$-$422_n$ is applied to a summing device 424 where an echo estimate associated with each tap is produced. This echo estimate is subtracted from the receive signal supplied on conductor 426 by the summing device 428 to yield a resulting receive signal with the estimate echo removed. This is the same signal e that is supplied back to the gain multiplier 410 for use in subsequent correlations.

In the echo canceler illustrated in FIG. 7 a weighted sum of transmitted samples is employed to estimate the return echo. This is based on the known fact that optimum weights can be derived from the product of two matrices, namely the inverse of the transmit auto correlation matrix and the cross correlation vector. The same algorithm applied to the error signal yields tap adjustments after a first set of taps has been correlated. In the embodiment illustrated in FIG. 7, samples from the CODEC receive buffer are supplied to the conductor 426. Echo is cancelled by adding the dot product of corresponding transmit samples supplied on conductor 405 and canceler weights so that the resulting signal e may be stored after being modified by the adaptation constant $\alpha$ and, thereafter, the cross correlation components for each tap are formed at the output of the summing junction $414_0$-$414_n$ for each tap. The cross correlation vector is subsequently multiplied by the inverse of the auto correlation matrix to obtain coefficients for the canceler. The process is repeated with cancellation to obtain corrections for the echo canceler taps.

One advantage of this approach is that it employs the on chip dot product capabilities of the TMS32020 processor employed in the DSP$_1$ to reduce processing time.

In addition, this solution makes effective use of a known characteristic of the transmit signal to insure a prompt and accurate solution. In essence it approaches a least squares best fit solution while converging rapidly.

Figure 8B:
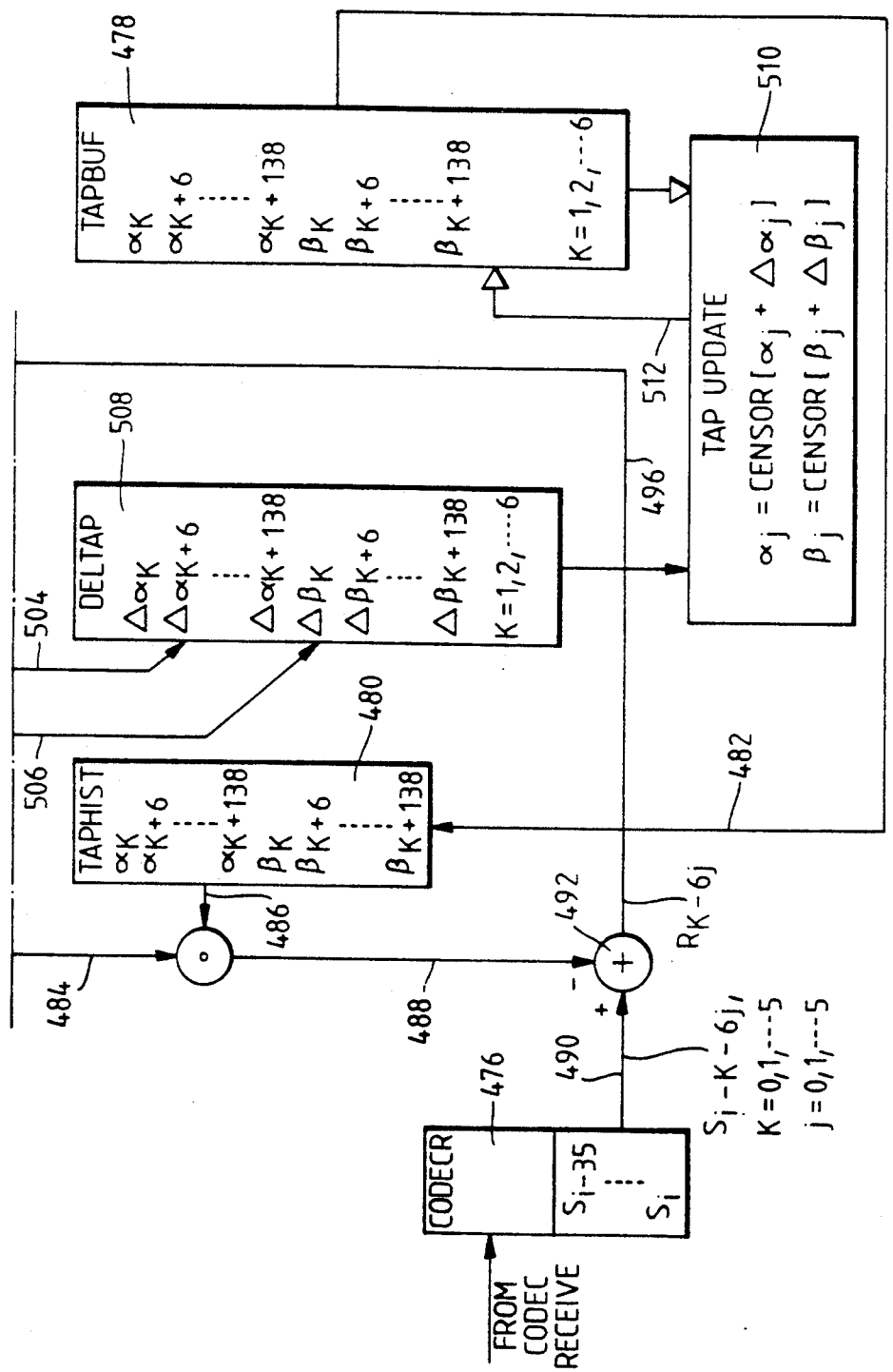

Referring now to FIG. 8 there is shown a signal processing diagram indicating the manner in which a second embodiment of echo cancellation apparatus, according to the instant invention, may be implemented under software control. In the embodiment of the echo canceler illustrated in FIG. 8 a history of transmit baud vectors, rather than samples, are employed. Again, the dot product capability of the particular Texas Instrument processor being employed is utilized to a high degree.

The particular approach set forth in FIG. 8 has a plurality of advantages. More particularly, correlation between adjacent vectors is much lower than between samples which results in the convergence of gradient algorithms being faster. Correlations between canceler taps is reduced thus permitting censoring or the zeroing out of taps having small values. Censoring, in turn, shortens the effective length of the active canceler, speeds convergence and improves accuracy over longer intervals. Further transmit vector processing is carried out at the baud rate, thus reducing execution times. In addition, since the complex vector domain affords a mechanism for frequency offset compensation, vectors can be rotated to compensate for frequency offset in the echo path.

The embodiment of the echo canceler illustrated in FIG. 8 employs a history of transmit vectors which are rotated by the transmit carrier frequency. In the sample domain the residue R or an echo free sample is approximated by:

$$R_{i-K} = S_{i-K} - \sum_{j=1}^{144} a_j X'_{i-j} - \sum_{j=1}^{144} \beta_j Y'_{i-j} \qquad \text{Eq. 1}$$

where X' is the real portion of a transmit vector which is rotated by the transmit carrier frequency or corresponds to equation 2

$$x' = X \cos(W_c t) = y \sin(W_c t)$$

$$y' = X \sin(W_c t) + y \cos(W_c t) \qquad \text{Eq. 2}$$

Alpha corresponds to the real portion of the echo tap value and beta corresponds to the imaginary portion of the echo tap value.

Turning specifically to FIG. 8 it will be seen that the top portion thereof represents a portion of the transmit modulator path to the CODEC while the lower portions thereof are illustrative of the storage employed in implementing this embodiment of the echo canceler. More particularly, as shown in the top portion of FIG. 8, the transmission portion of the path to the CODEC, as present in the digital signal processor $DSP_1$, includes a complex impulse generator 450, a pair of low pass filters 452 and 454, a pair of multipliers 456 and 458, a summing device 460 and a buffer 462.

The complex impulse generator 450 receives data to be transmitted in the form of dibits, as aforesaid, or bit pairs whose value is indicative of one or four angles to be utilized in angle modulating the same. The complex impulse generator 450 is thus entirely conventional and generates, at the outputs thereof annotated X and Y, the X and Y coordinates on a circle for the angle modulated output. The X and Y signals are applied, as indicated, to a pair of low pass filters 452 and 454 which may take the conventional form of transmit band filters. The outputs of the filters 452 and 454 are thereafter applied to the multipliers 456 and 458 wherein the X and Y coordinate values present thereon are multiplied by the factors Cos ($W_c t$) and $-\sin(W_c t)$ so that the same are quadrature modulated in the well known manner. These signals are then supplied to the summing device 460 and the resulting value is loaded into a CODEC transmit buffer 462 which takes the form of a conventional buffer, as shown in FIG. 1, for subsequent application to the CODEC per se, as indicated in FIG. 8.

The X and Y outputs of the complex impulse generator 450, which as aforesaid, X and Y coordinates of a circle, are supplied to the function blocks 464 and 466 where the X and Y coordinate values are effectively multiplied by a value $W_c t$ so the same may be employed to cancel echo in a carrier modulated signal. In essence, the function blocks 464 and 466 translate the X and Y outputs of the complex impulse generator 450 to the X' and Y' values present in equation 1 and as indicated in FIG. 8 to the values defined by equation 2. As a result, each X' and Y' value output by function blocks 464 and 466 correspond to the X' and Y' vectors at some instant i plus a delay D as is also indicated in FIG. 8.

The various X' and Y' vectors generated by the function blocks 464 and 464 are loaded into the buffers 468 and 470 annotated, respectively, X' and Y' VECBUF. The X' and Y' buffers 468 and 470 are slower off chip buffers capable of holding, for example, 100 vector values each. Values from vector buffers 468 and 470 are periodically loaded into the buffers 472 and 474 annotated X' vector history and Y' vector history, respectively. These buffers are relatively fast on chip buffers each holding 29 X' and Y' vectors, respectively. The values in the vector history buffers 472 and 474 are periodically refreshed with values from the vector buffers 468 and 470. It is the vector history buffers 472 and 474 which are employed by $DSP_1$ for purposes of calculating echo canceling values.

At 2400 bps the vector or baud rate is 1/6 the sample rate. Thus, for a sample rate of 7200 hz the baud rate will be 1200 hz. Under these circumstances, only 1/6 of the taps are used when computing a sample. The other taps multiply zero vector values from equation 1 and it will be seen that in the 20 ms canceler characterized different subsets of taps will come into play as i is advanced in time. An efficient algorithm for canceling echo may be represented by the equation:

$$R_{i-35+6K+l} = S_{i-35+K+l} - \sum_{j=1}^{24} a_{145-6j+l} \cdot X_{30-j-l} - \qquad \text{Eq. 3}$$

$$\sum_{j=1}^{24} \beta_{145-6j+l} \cdot Y_{30-j-l}$$

wherein echo estimates spaced at 6 sample intervals are computed from the same subset of taps or the same tap phase group. In equation 3, R again equals the residue, echo free sample, S is received the sample with echo and may be represented by a vector history. Alpha and beta are complex tap values where alpha corresponds to a real number and beta corresponds to an imaginary number. X and Y are complex vector values where X corresponds to the real portion of the vector and Y corresponds to the imaginary number. L=0, 1, 2, 3, 4, and 5 corresponding to the tap phase group and K=0, 1, 2, 3, 4, and 5 denoting a sample in that phase group. Furthermore, only non-zero vectors are included in equation 3 such that $X_i$, $X_{i-1}$, $X_{i-2}$, etc. are spaced six samples apart.

Returning now to FIG. 8 it will be seen that in addition to the vector value stored in the vector history registers 472 and 474, a buffer 476 is provided which, as indicated, receives signal information from the CODEC receive buffer and thus stores samples corresponding to the S term in equation 3. In addition, tap groups are loaded from a larger, off chip tap buffer 478 and a subgroup thereof is loaded into an on chip, high speed buffer 480 annotated TAPHIS or tap history through the cable 482. Thus the TAPHIS buffer 480 as indicated contains the alpha and beta or complex tap values separately stored in an on chip buffer so the dot capability of the chip may be employed.

The base cancellation process, as illustrated in FIG. 8, is executed once per 5 ms frame. More particularly, the first tap group (L=0) is loaded onto the chip program memory and equation 3 is solved for k=0, 1, ... 5 by solving for $R_i$-35, $R_i$-29, $R_i$-23, ... $R_i$-5. These values correspond to R35, R29, ... R5 in FIG. 8. The second tap group (L=1) is loaded next and $R_i$-34, $R_i$-28, ... $R_i$-4 is computed. The third tap group (L=2) is loaded and $R_i$-33, $R_i$-27, ... $R_i$-3 is computed. This is continued until echo on all 36 samples has been initially subjected to cancellation procedures.

Thus, as shown in FIG. 8, the vector history loaded to on chip buffer memory 472, a tap group loaded to on chip program memory 480 are employed in the manner indicated by the arrows 484 and 486 to obtain the dot products of the taps and vectors. Thereafter, in the manner indicated by the arrows 488 and 490 and the summing device 492, the dot products of the taps and vectors are subtracted from the received samples stored in register 476. The resulting residue values are stored in a residue history buffer 494 in the manner indicated by the arrow 496.

The residue values, i.e. samples with echo removed, are stored in the buffer 494 in phase groups. The samples in the buffer 494 are subsequently scaled or multiplied by the software AGC scale factor (SAGCS) as indicated by the multiplier 498. Thereafter the scaled residue samples are stored in time sequence in a buffer 500 which corresponds to the transfer buffer for the digital signal processors $DSP_1$ and $DSP_2$. The residue samples stored in the buffer 494 are also loaded, as indicated, into a second, on chip, residue buffer 502 so that the real and imaginary values thereof may be subsequently employed to obtain dot product values with real and imaginary portions of the vector history stored in the registers 472 and 474 for training. These values, as indicated by the arrows 504 and 506 are then loaded in a buffer 508 called DELTAP where the same are utilized as tap update (delta values) values in training. These values or the actual complex tap values stored in the register 478 are loaded into a tap update register 510 wherein complex tap update values are calculated and, as indicated by the arrow 412, loaded into the tap buffer 478. As indicated, in the tap update register 510, updated tap values which do not change are ignored or censored.

The errors in tap values (delta taps) are approximated by the cross correlation between the vectors and the residues generated using the corresponding taps. The cross correlations are accumulated over 25 frames prior to upgrading the taps. The per frame process proceeds as follows:

$$\Delta\alpha_{145-6j+l} = \Delta\alpha_{146-6j+l} + \sum_{K=0}^{5} X_{30-K-j} * R_{i-35+6k+l} \quad \text{Eq. 4}$$

$$\Delta\beta_{145-6j+l} = \Delta\beta_{145-6j+l} + \sum_{K=0}^{5} Y_{30-K-j} * R_{i-35+6K+l} \quad \text{Eq. 5}$$

Six products (K=0, 1, ... 5) are added to each component of each delta tap (J=1, 2, 3 ... 24) in a group and also six groups (L=0, 1, ... 5) are processed each frame. This results in an updating of all 144 complex tap errors.

Taps are updated by adding delta taps to taps $$\alpha_j = \alpha_j + \Delta\alpha_j \Big|_{j=1}^{144} \quad \text{Eq. 6}$$

$$\beta_j = \beta_j + \Delta\beta_j \Big|_{j=1}^{144} \quad \text{Eq. 7}$$

censoring level $\rho$ proportional to energy in the residues is used to zero out the lesser taps according to:

$$\sigma = \sigma_{SCALE} * \sum_{i=1}^{N} R_i^2 \quad \text{Eq. 8}$$

where N=36 samples per frame times 25 frames or 900. If $$|\alpha_j| + |\beta_j| < \rho, \text{ then } d_j \to 0, \beta_j \to 0. \quad \text{Eq. 9}$$

Figure 9:
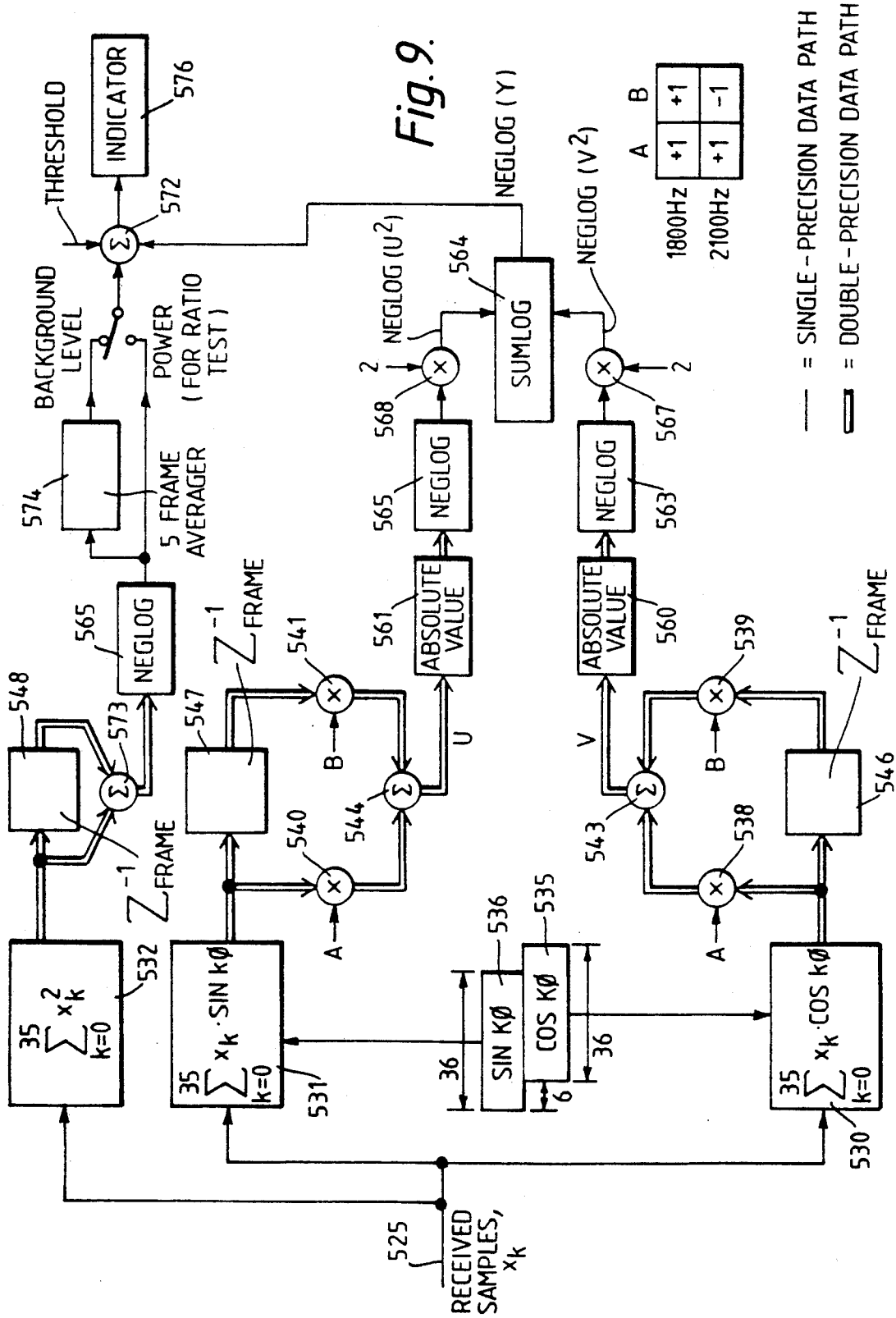
FIG. 9 is a signal processing diagram indicating the manner in which tone detection is implemented under software control.

Referring now to FIG. 9, there is shown a functional block diagram illustrating the manner in which the presence of tone and the drop out of tone are detected in accordance with the teachings of the instant invention. More particularly, it shall be recalled from the description of FIG. 5 that setting and training of the automatic gain control circuit used within the instant invention required that the presence of an 1800 hz and 2100 hz ESD tone be detected. In addition, drop out of the 2100 hz ESD tone had to be ascertained. Furthermore, it was also necessary to detect a transition from a 2100 hz ESD tone to a 1500 hz tone or scrambled 1's as well as a transition from an 1800 hz tone to scrambled 1's. In each case, this may be treated as a drop out of a tone.

FIG. 9 illustrates the manner in which this is done. The tone detection concept implemented in FIG. 9 is based upon estimating the power of a 1500, 1800 or 2100 hz signal. In essence, the input signal is multiplied by the SIN W $\phi$ or COS W $\phi$ where W equals $2\pi *$ 1500 radians/second for a 1500 hz signal, $2\pi *$ 1800 radians/second for an 1800 hz signal or $2\pi *$ 2100 radians/second for a 2100 hz signal. The signals are integrated over two frames by summing and the two components are squared and added together to get a power estimate in terms of the sum of the squares or an approximate to an RMS value.

Mathematically an input signal in the form of A * SIN KW T+$\theta$ is multiplied by the sign and cosine and sampled at 7200 samples per second to achieve $$U = \sum_{k=0}^{N-1} A\sin(k\omega T + \theta)\sin(k\omega_0 T)$$

$$V = \sum_{k=0}^{N-1} A\sin(k\omega T + \theta)\cos(k\omega_0 T)$$

Then the desired power is $$Y = U^2 + V^2$$

If $\phi$ for $\phi_0 = 1800$ hz is defined as 90° per sample while $\phi$ for $\phi_0 = 2100$ hz is defined as 105° per sample and N is chosen as 72, equation 8 becomes $$U = \sum_{k=0}^{71} A\sin(k\omega T + \theta)\sin(k\phi)$$

$$V = \sum_{k=0}^{71} A\sin(k\omega T + \theta)\cos(k\phi)$$

When quantizing error is analyzed for the 1800 and 2100 hz case it is found that no error is present for the 1800 hz case and that for the 2100 hz case the RMS signal/RMS error is 88.4 db. Further, the square of the integration interval yields a sine (X)/X envelope and by choosing N equal to 72 a 100 hz bandwidth is obtained because the integration interval is 1/100 seconds long. Choosing N to be 72 also gives mathematical nulls at multiples of 100 hz due to the aforesaid integration interval. In addition, the approximate 1800 hz filter is exact in its frequency response with no error and with zero correlation with 2100 hz. The approximate 2100 hz filter has a period of 300 hz (24 samples) with odd symmetry. Therefore it only has odd 300 hz components with zero correlation with 600, 1800 and 2400 hz. Accordingly, if the transmitted 1800 hz signal has an exact period of 12 it will have only 600 hz components with no 2100 hz component. It follows that if the transmitted 2100 hz signal has a period of 24 with sign reversal if 12 samples are advanced in MU-LAW form, then it will have only odd 300 hz components. The transmitted 2100 hz waveform can then be selected from a table of 24 numbers which minimizes the quantization error.

Referring specifically to FIG. 9 it is seen that received samples supplied on conductor 525 are supplied to the summation function blocks 530-532. The 72 tap filter can be implemented in groups of 36 taps per frame. Therefore, each of the summation function blocks 530-532 provide summation function from 0 through 35 as indicated. For the 1800 hz tone the same 36 taps can be applied each frame and the results added. For the 2100 hz tone the same 36 taps can be applied each frame and the results can be subtracted, it being noted that 36 samples is one and one half periods of the 24 sample period. With respect to summation function blocks 530 and 531, after each sample applied to function blocks 530 and 531 it is multiplied by a SIN K $\phi$ or cos K $\phi$ function as indicated by the rectangles 535 and 536.

The 36 taps associated with the results from an 1800 hz tone are added while the results from the 36 taps associated with a 2100 hz tone can be subtracted. This addition or subtraction is indicated by the A and B multipliers 538-541 wherein the value for A and B for 1800 hz is +1 while the value for A and B for 2100 hz is +1 and −1, respectively. In each case the summation performed by the elements 543 and 544 occurs with respect to samples delayed by one frame as indicated by the delay units 546-548. Thereafter, as indicated by the elements 560 and 561, the absolute value is taken followed by the negative logarithm thereof as indicated by the elements 563-565. The resulting logarithm from blocks 563 and 565 is multiplied by 2 by the elements 567-568 to achieve a squared function as well known to those of ordinary skill in the art.

Thereafter, as indicated by the block 564, the sum log function (i.e. a log of the sums is computed from the individual logs. This value is then summed, as as indicated by the summation device 572, with a threshold level and a background level obtained from elements 532, 573 and five frame averaging device 574. The output of the summing device 572 is then applied to an indicator for the software, as as indicated by the rectangle 576.

Under these circumstances, the presence of a 2100 hz tone may be confirmed when the filter output power less the total power is greater than −7.5 db for five consecutive frames. Similarly, the presence of 1800 hz may be confirmed when the filter output power less the background power is greater than −6 db. The detection of 1500 hz is identical to 2100 hz except the sine and cosine functions are different. The absence of 2100 hz is determined by counting frames where 2100 hz energy is more than 7.5 db below the total energy. The absence of 1800 hz is confirmed when the filter output power, less the total power, is less than −3 db.

Figure 10:
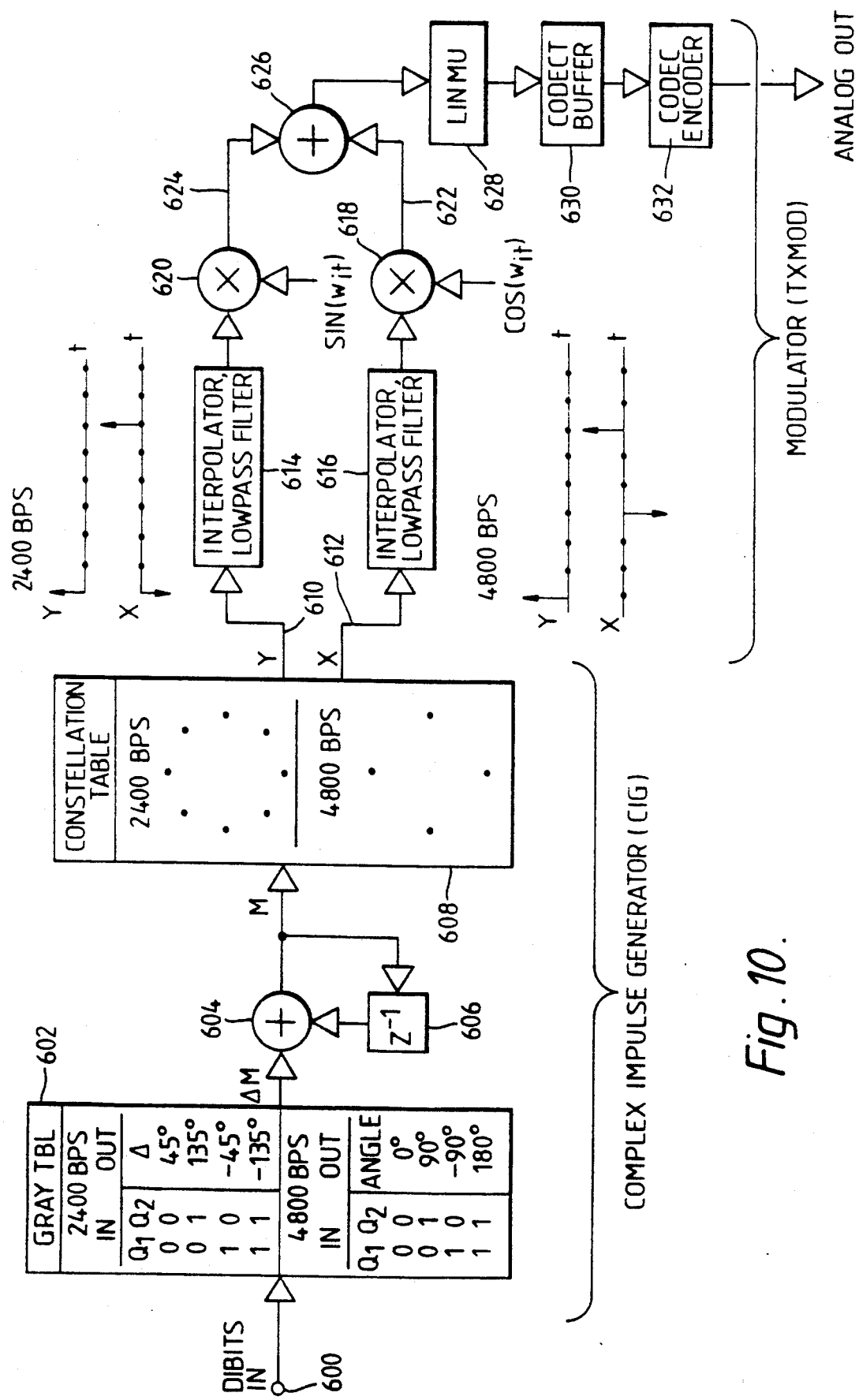
FIG. 10 is a schematic diagram of an exemplary 2400/4800 bps transmitter which may be employed in the embodiment of this invention shown in FIG. 1.

Referring now to FIG. 10 there is shown a schematic block diagram of an exemplary 2400/4800 bps transmitter as employed in the embodiment of this invention illustrated in FIG. 1. For purposes of correlating the block diagram illustrated in FIG. 10 it should be noted that the functions set forth in FIG. 10 involve the modem transmitter 68 (FIG. 1), the linear to MU-LAW converter 70 (FIG. 1) and the CODEC transmit buffer 74 (FIG. 1), as well as the outputs thereof through the first interrupt handler 56 to the coder/decoder unit not shown.

The function of the 2400/4800 bps transmitter illustrated in FIG. 10 is to convert each dibit of data to be transmitted into one of four phase shifts corresponding to the four possible values of the dibit. The phase shift, once generated, is added to an instantaneous angle which rotates 1-½ or ¾ cycles per symbol period, depending on the symbol rate. Elapsed time is measured by the 7.2 khz sampling interrupt rate and symbol periods by the transmit phase lock loop process indicated as element 64 in FIG. 1. Under these circumstances six sampling interrupt periods define a time window of duration equal to a symbol period plus or minus a tiny fraction of a symbol period which may be zero. This tiny fraction is a function of the transmitted symbol rate. Each symbol rate so generated is converted to a sinusoidal segment of 1/256-cycle resolution and three symbol periods in length, window weighted with a SIN (X)/X function and then overlaid on and added to its predecessor with one symbol period intersymbol time displacement. This modulation technique is considered to be superior to one which employs a fixed transmitted-symbol rate since the same is self-adapting to an internal external source of timing with no effect on echo canceler performance. The transmitter employs a data driven modulation function for both training and traffic without the prefix of any built-in training sequence.

Turning specifically to FIG. 10 it will be seen that dibits originally supplied from the IOP to data register 88 as shown in FIG. 1 are applied to terminal 600. Each dibit is supplied under software control to a gray code table which acts to convert each dibit of data to be transmitted into one of four phase shifts corresponding to the four possible values of the dibit, i.e. 00, 01, 10 or 11. Appropriate translation for 2400 bps or 4800 bps will have already been determined since training for the transmitter must have already been completed and, as was discussed in connection with FIG. 5, the rate will have already been determined in connection with the capabilities transmissions which occurred during training.

The phase shift generated is added to the preceding sum of shifts by the summing device 604 wherein the predecessor is provided with one intersymbol time displacement, which is a baud delay, as indicated by the delay 606. The delay device 606, as indicated by the annotation thereof, inserts a delay of one sample period.

The output of the summing device 604 is provided to the constellation table 608 which represents, as indicated in FIG. 10, the last stage of the complex impulse generator. The constellation table 608 provides a software angle mask which, when coupled with the number of samples per baud, acts to add an instantaneous angle to the output value obtained form the summer 604 and to insure that the resulting angle corresponds to one of a plurality of discrete angles. Thus, in the case of 2400 bps transmissions the resulting angle must correspond to one of 8 angles as indicated by the circular dot pattern while in the case of 4800 bps the resulting angle must correspond to one of 4 angles as indicated by the four dots located at 0, 90, 180 and 270° positions within the element 608. The number of samples per baud utilized for 2400 bps is 6 while the number of samples per baud utilized for 4800 bps is 3.

The output of the constellation table, broken into X and Y components as indicated, is supplied through conductors 610 and 612 to a pair of interpolator low pass filters 614 and 616. The interpolate filters, which may be conventional, are employed to smooth the output of the constellation table 608 caused by predictable correlation between adjacent samples. The output of the interpolation filters 614 and 616 are supplied to a pair of multipliers 618 and 620 wherein each symbol generated is converted into a sinusoidal segment by multiplication with the vectors $\sin W_c t$ or $\cos W_c t$. The output of the multipliers on conductors 622 and 624 are supplied to a summing device 626 wherein the resulting vectors are added and supplied to the linear to MU-LAW encoder 628. The linear to MU-LAW encoder 628 semilogarithmically converts 14 bit samples from the summing device 626 into 8 bit samples which are thereafter loaded into the CODEC transmit buffer 630. At 4800 bps 18 MU 255 samples are placed into the CODEC buffer, it being recalled that in this case the number of samples per baud is 3 and the transmit software is called twice for each 5 ms frame. At 2400 bps the transmit module puts 36 MU 255 samples into the transmit buffer 630. Here the number of samples per baud is 6 and the transmitter is only called once per 5 ms frame. The output of the CODEC buffer 630 is applied to the encoder portion of the CODEC 632 where the same is transmitted as an analog signal as indicated.

At the 2400 bps rate, the modulation rate of the transmitter illustrated in FIG. 10, will be 1200 baud at 2 bits per baud. The modulation technique employed is DPSK + or − 45°, + or − 135°. The sampling rate is 7200 hz at 6 samples per baud and the carrier frequency will be 1800 hz. At 4800 bps the modulation rate is 2400 baud with 2 bits per baud. The modulation technique is DPSK 0°, + or − 90° and 180°. The sampling rate is 7200 hz at 3 samples per baud and again the carrier frequency is 1800 hz.

Figure 11:
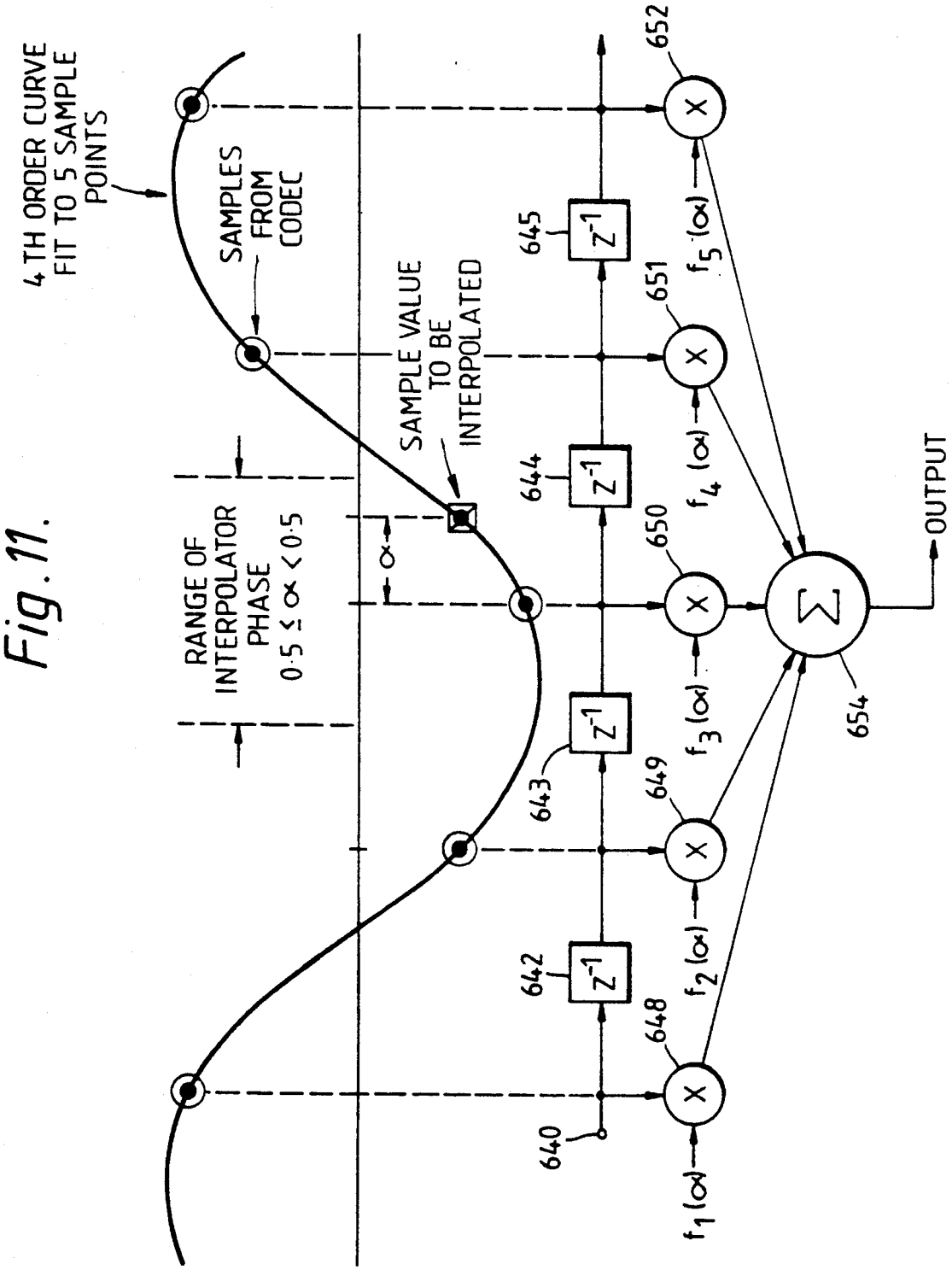
FIG. 11 is a signal processing diagram indicating the manner in which the signal interpolation filter shown in FIG. 1 is implemented.

Referring now to FIG. 11 there is shown a signal processing diagram indicating the manner in which the signal interpolation filter shown in FIG. 1 is implemented under software control at the receiver (DSP $_2$). The interpolation filter functions to calculate what a received sample value would be if the receive side of the CODEC were to be strobed either earlier or later by up to $\frac{1}{2}$ of a 7200 hz clock cycle. In FIG. 11, linearized 7200 hz input data from DSP $_1$ is supplied to the terminal annotated 640. This input data is applied through a series of 12 sample delays 642-646 so that a commonly located terminal for each of a series of 12 multipliers 648-653 is obtained. In addition, each multiplier 648-653 is provided with interpolator tap weights $F_1$ (alpha) − $F_{12}$ (alpha) from a table in ROM indexed by alpha or calculated once per update cycle. The values of the 12 resulting samples are summed as indicated by the summation device 654 to yield an output corresponding to the value of the interpolated samples. The interpolators are linear phase low pass filters which cut off at 2.7 KHz. The inband responses of the 48 interpolators are identical except that delay is increment 1/48th of a sample from 5-1/48 to 6 samples delay. The interpolator are broadband; that is the same interpolators operate at 4800 bps (2400 baud) as at 2400 bps (1200 baud). A constant amount of earliness or lateness (phase) is applied to a 5 ms frame of samples. This phase is updated once per frame.

The error signal provided by the baud sync metric, as shown in FIG. 1, is fed to a second order servo where integration with a relatively long time constant is used to obtain symbol-frequence-offset estimates. The error signal is integrated with a shorter time constant to obtain phase correction. The sum of the symbol frequency offset estimate and the phase correction determines the rate of change of interpolator phase. When the interpolator delay in the 7200 hz clock cycles becomes less than −0.5 (5-1/48 samples) or greater than or equal to 6 samples, the interpolator at the other end of the set (5-1/48 goes to 6 or 6 goes to 5-1/48) is used and the sample load point is shifted. The filter alignment with respect to the samples is adjusted by +1 or −1 samples, respectively.

Figure 12A:
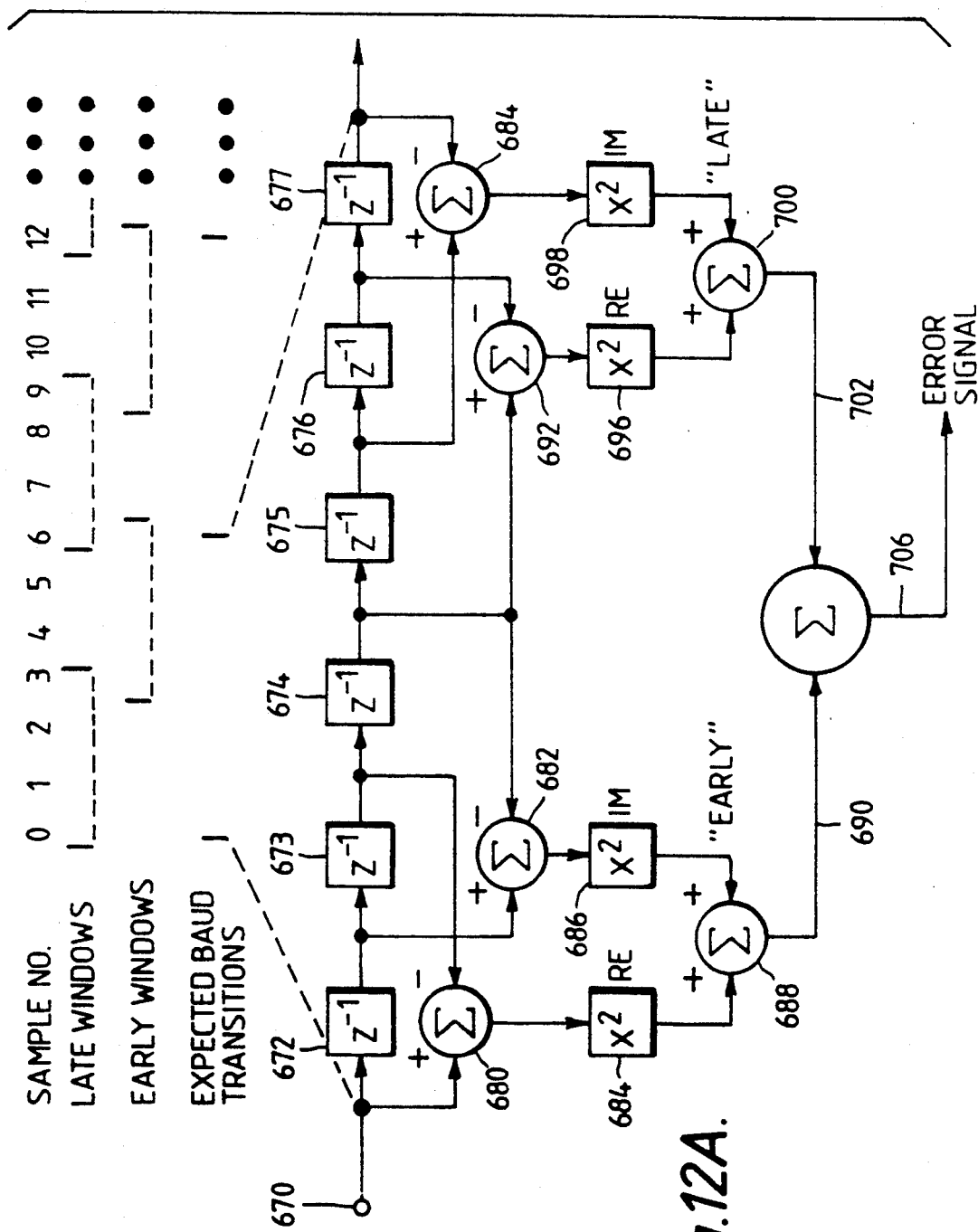
FIG. 12A is a signal processing diagram indicating the manner in which baud alignment error is measured and an error signal generated by the baud-sync metric apparatus illustrated in FIG. 1.

Referring now to FIG. 12 there is shown a signal processing diagram indicating the manner in which baud alignment error is measured at 2400 bps and an error signal is generated. This process measures the baud alignment error by measuring the correlation of the 1800 hz carrier to 4 sample signal segments at the beginning and end of the baud so as to correspond to early windows and late windows, respectively. When the baud transition begins to drift out of one of the windows, the correlation in the opposite window on the average becomes stronger. The difference in energies of correlation is employed to provide an error signal.

Thus, as shown in FIG. 12, a signal from the interpolator is provided at the terminal 670. This signal is applied through a series of one sample delays, as as indicated by the rectangles 672-677. A first point for correction is obtained by applying the signal from the input of delay 672 to the summing device 680 while a second input is applied to the negative terminal of the summing device 680 from the output of the second delay 673. In a corresponding manner this is done with the input signal to the delay 673 and the output signal for the delay 674 with respect to summing device 682. The outputs, in the form of a difference, from each summing device 680 and 682 are squared in the manner indicated by the blocks 684 and 686 and thereafter summed by the summing device 688 to generate an output corresponding to the early signal on the conductor 690.

The late signal is generated in much the same manner. Here the output of delay 674 is applied to the plus input of the summing device 692 while a negative input thereto is provided from the output of the delay 676. The output of the delay 675 and the output of the delay 677 are utilized as + and − inputs to the summing device 694. The outputs of summing devices 692 and 694 are squared in the manner indicated by blocks 696 and 698 and then summed in the manner indicated by device 700. This input is applied on conductor 702 as a late input. The early and late inputs on conductor 690 and 702 are summed by the device 704 to create a baud phase error signal on conductor 706.

Figure 12B:
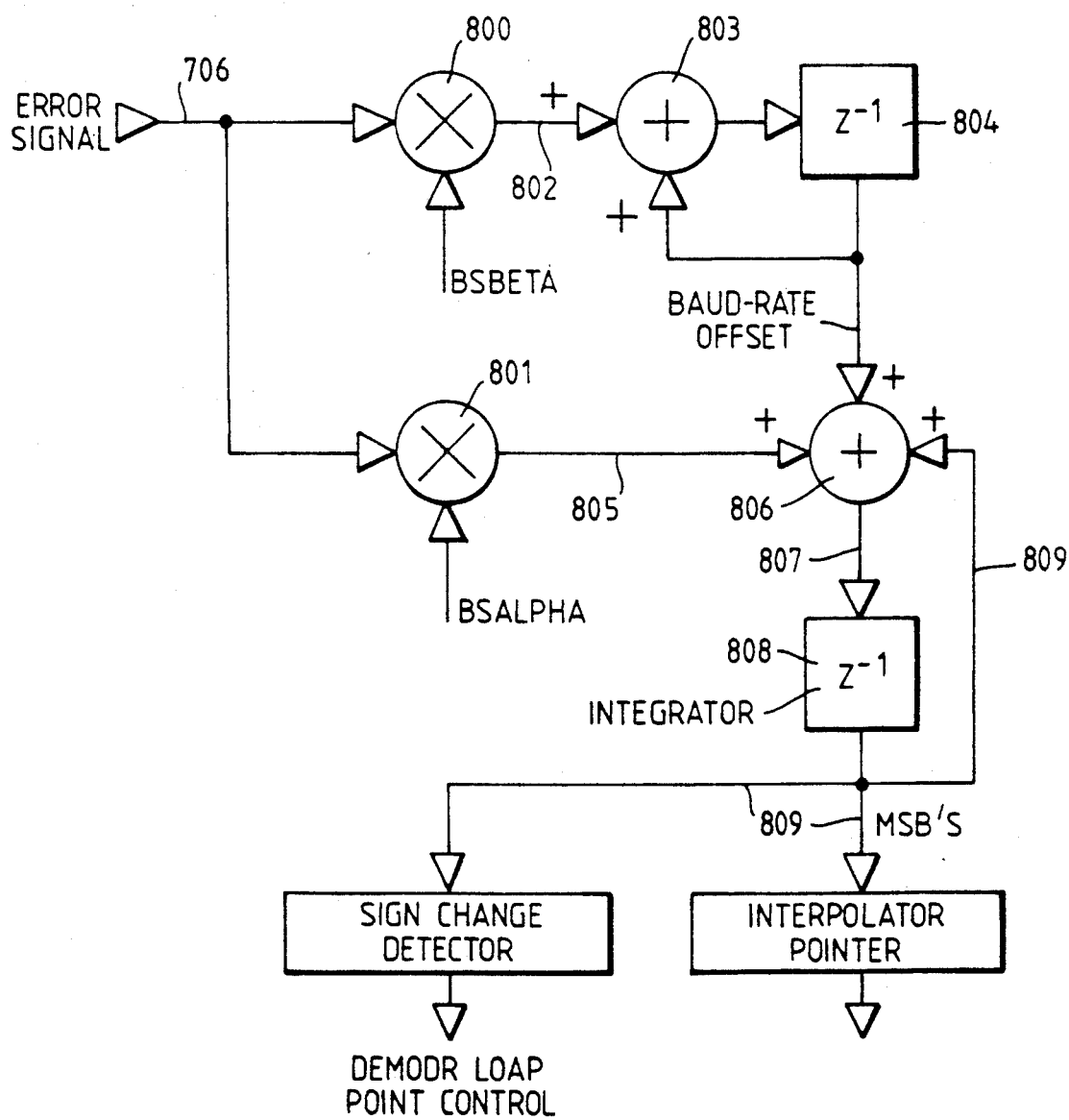
FIG. 12B is a block diagram illustrating a second order baud servo.

The baud phase error is fed to the second order servo shown in FIG. 12B where the error is scaled constants BSALPHA and BSBETA. See multipliers 800 and 801. The BSBETA component on path 802 is fed to a digital integrator (block 803 and 804). The output of this integrator is summed with the BSALPHA component on conductor 805 at summer 806. The integrator at 803 and 804 is referred to as the second integrator because the BSBETA component is integrated twice. The second integrator output value is an estimate of the baud rate or baud frequency offset. The sum at component 806 conductor 807 is applied to a second integrator comprised of delay unit 808 and feedback path 809 through summer 806. The most significant bits on 809 excluding the sign bit are used as the address to the interpolator filter to be used next frame. A change in the sign bit signal an advance (+ to −) or a back step (− to +) for the DEMODR buffer output pointer A check on the DEMODR input and output pointers is made following sample load from the DSP₁ to DSP₂ transfer memory. If the output pointer is getting ahead of the input pointer a short (i.e. a 5 baud) frame is run. If the input pointer is catching up with the output pointer a 7 baud frame is run. Most frames are 6 bauds at 2400 bps. At 4800 bps 11, 12 or 13 baud frames are run. In this manner the average baud rate at the receiver is made equal to the rate transmitted at the remote modem.

Figure 13:
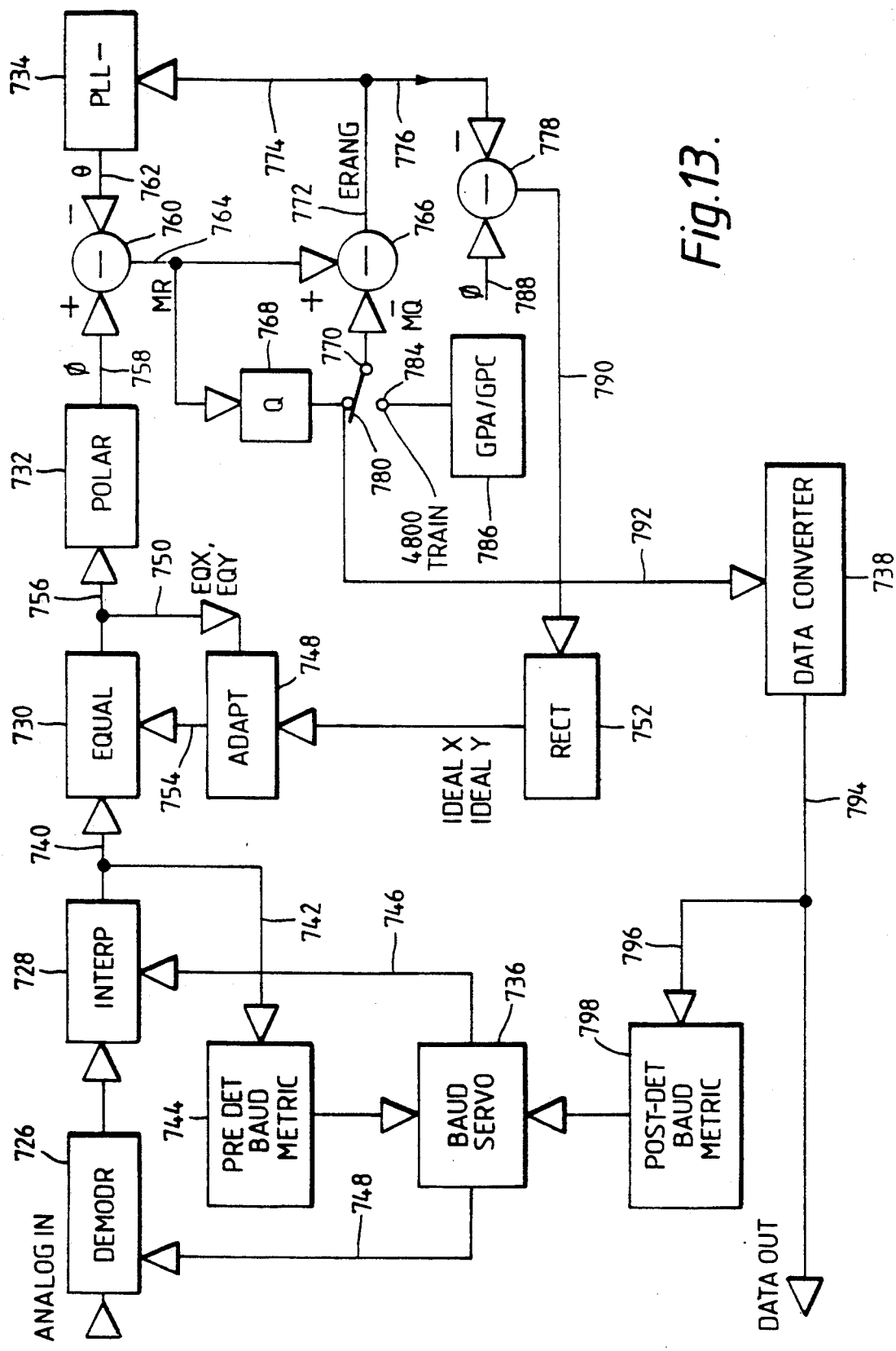
FIG. 13 is a signal processing diagram indicating the manner in which the demodulator and adaptive equalizer of the instant invention operate in the modem receiver under software control.

Referring now to FIG. 13, there is shown a signal processing diagram indicating the manner in which the demodulator and adaptive equalizer of the instant invention operate in the modem receiver process under software control. The demodulator is, in essence, a contiguous string of modules within the assembly code employed for the digital signal processor DSP₂. The demodulator functions illustrated in FIG. 13 essentially comprise a demodulator register 726 (DEMODR), an interpolator 728 (INTERP), an equalizer 730 (EQUAL), a polar coordinate converter 732 (POLAR), a phase locked loop 732 (PLL), a baud servo 736 and a data converter 738.

The demodulator register 726 receives 36 samples from the transfer out buffer 90 within the shared memory 60 of the digital signal processor DSP₁ and the transfer in buffer 116 of the digital signal processor DSP₂, also shown in FIG. 1. These samples are converted from a 72 byte format to 36 words and stored within the DEMODR buffer 726. The signals thus stored in the demodulator receive buffer 726 represent a digitized analog signal received after transmission on which the automatic gain control function has been completed.

The demodulator receive buffer 726 includes a register capable of storing approximately 144 samples or four frames of data and is provided with a separate input and output pointer. As mentioned above, the baud servo may advance or retard the DEMODR output pointer; whereas the input pointer always advances 36 samples per frame. Depending upon the relationship of the input and output pointers, an increase or decrease by a single baud in the number of bauds being processed in a current frame may be invoked to insure that an appropriate relationship between the input and output pointers is maintained. In this regard it is noted that for a 2400 bps rate, 5, 6, or 7 bauds may be processed per frame while for 4800 bps rate, 11, 12 or 13 bauds per frame may be processed with the values of 6 or 12 bauds being the norm for each rate.

Each group of samples to be processed per frame is read from the demodulator register 726 and supplied to the interpolator 728. The interpolator 728 acts in the manner described in connection with FIG. 10 to insert a fractional sample delay into each sample in a manner to place the receive samples on a curve, as shown in FIG. 10, so that the same exhibits a delay other than that with which it was loaded. The interpolator 728 is one of a group of 48 FIR filters of 12 taps each which are loaded, once per frame, by the baud servo 736 to maintain baud phase (also see FIG. 12B). The interpolator 728 typically delays the input signal by 5 and 1/48th to 6 samples in 1/48th sample increments. The interpolator algorithm takes dot products of 12 interpolator coefficients and 12 samples to generate interpolated samples. The algorithm must be modified to provide 6 samples per baud at 2400 bps and 3 samples per baud at 4800 bps. The output of the interpolator 728 is supplied through the conductors 740 and 742 to the equalizer 730 and the predetection baud metric unit 744. The predetection baud metric unit 744 is operative during 2400 bps modes of operation but not during 4800 bps modes. However, even when a 4800 bps mode is present, preliminary training occurs at 2400 bps rate.

The function of the predetection baud metric unit 744 is to place the samples received on the baud boundary with respect to the equalizer delay line. Since the predetection baud matrix 744 receives the output of the interpolator 728 on conductor 742 it will be seen that its output to the baud servo 736 will cause the same to shift the delay inserted by interpolator 728 to achieve appropriate placement on the baud boundary. The control of the baud servo on the interpolator is implemented through conductor 746 where appropriate words are supplied by the baud servo 736 to cause the interpolator to select the appropriate filter. The second output of the baud servo on the conductor 748 controls input pointer advancing or retarding it by one sample. The predetection baud metric and baud servo programs are run once per frame at the end of the frame. The baud servo is a second order loop which selects the interpolator to be used next frame and which increments or decrements the demodulator register output pointer when the interpolator address wraps around.

The equalizer 730 acts to compensate for or equalize telephone line low pass filter characteristics and also splits the resulting bauds into complex vectors, having both real and imaginary components. The equalizer is caused to adapt by the adaptation unit 748 in a manner to be described in greater detail in connection with FIG. 14. Here it is sufficient to appreciate that the current condition of equalization is received by the adaptation unit 748 on conductors 750 together with the rectangular coordinates of the ideal angle for the vector being processed. The rectangular coordinates are provided by the rectangular coordinate converter (RECT) 752. As a result, the adaptation unit 748 compares the coordinates of the ideal angle as received from the rectangular coordinate converter 752 and the coordinates of the actual vector as received on conductor 750 and provides an error signal on conductor 754. The equalizer 730 in essence performs a Hilbert transform to generate 2 components 90° in phase. Effectively, the equalizer 730 takes the dot product of 36 interpolated samples and 36 complex equalizer coefficients and generates a complex baud vector (EQX, EQY).

The output of the equalizer 730 is supplied through the conductor 756 to the polar coordinate converter 732. The polar coordinate converter 732 would normally put out a pair of signals corresponding to the radius and angle at the outputs thereof. Here, however, only the angle of the vector is put out on the conductor indicated as 758, the radius being constant. Further, since at the modulator each vector was rotated every six samples the vector received must be restored to a condition prior to such rotation. Therefore the carrier angle, $\theta$, is subtracted from the equalizer angle at device 760 to gain an estimate of the transmit angle prior to modulation. The phase lock loop 734 executes a second order phase lock loop algorithm and advances the carrier angle $\theta$ as present on conductor 762. The nominal carrier advance is made variable so that the same may change as a function of the 2400 bps or 4800 bps rate available.

The output of the subtraction unit 760 on the conductor 764 is supplied to the subtraction unit 766 and the quadrant locator 768. The subtraction unit 766 receives a second input from the conductor 770.

The subtraction unit 766 generates an error angle (ERANG) on the conductor 772 which is applied through the conductor 774 to the phase lock loop 732 and through conductor 776 to the subtraction unit 778. As a result, the raw modulation angle MR on conductor 764 corresponds to $\phi$-$\theta$ and the error angle (ERANG) on conductor 772 corresponds to MR-MQ where $\theta$ is the carrier angle and MQ is the ideal baud angle.

For 2400 bps modes of operation and in normal run mode at 4800 bps, the value MQ is obtained by the operation of the quadrant locator 768 in quantizing the value of MR as present on conductor 764 into two bits and adding 45°. Thus, for 2400 bps modes of operation the switch 780 is in the condition shown. However, for the 4800 bps train mode of operation, the switch 780 is placed in communication with terminal 784 where data from the register 786 (GPA/GPC) is employed.

The register 786 is, in effect, two separate software tables GPA and GPC where the GPA table is employed when the demodulator is the responder while the table GPC is employed when the demodulator is the initiator in a given transmission. With the switch 780 in communication with the terminal 784 the demodulator will train off an expected sequence from the software table 786 and therefore the MQ input to the subtraction unit 766. The register 786 provides 4800 bps training sequences. This module typically contains a separate software table for conditions which obtain when the demodulator is the initiator or initiating device in a transmission or the responded device. Typically, each table will contain 12 ideal modulation angles in a buffer which is accessed as a function of the baud count.

In addition to the error signal (ERANG) on conductor 776 the subtraction device receives a second input on conductor 788 corresponding to the original angle $\phi$ at the output of the equalizer. The output of the subtraction device 788 on conductor 790 thus represents the ideal angle for the equalizer. This is supplied as indicated to the rectangular coordinate converter 752 where the same is supplied as a pair of rectangular vector coordinates to the adaptation unit 748 for the training unit of the equalizer 730. While the manner in which the equalizer unit is trained or caused to adapt will be described in greater detail in connection with FIG. 14, here it should be noted that the adaptation unit 748 employs the steepest descent gradient algorithm which adapts the complex equalizer coefficients to minimize the baud vector error.

The output of the quadrant device 768 on conductor 792 is applied to the data converter 738. The data converter 738 employs a GRAY coding scheme which is the reverse of what was utilized in the transmitter. The data converter 738 identifies the different angles supplied on the conductor 792 and effectively converts the same into a data word. In addition, 8 bits are packed into 16 bit words for transmission to the IOP. The output of the data converter 738 is supplied on the conductor 794. This output is supplied to the IOP and, more particularly, from the data out register 120 within the received shared memory 100 in the data signal processor $DSP_2$ to the IOP as shown in FIG. 1. In addition, this data is supplied through the conductor 796 to the post detector baud metric 798.

The post detector baud metric 798 is not operative for 2400 bps operation. Further, since the modulator illustrated in FIG. 13 initially trains at 2400 bps, the post detector baud metric 798 does not become operative until data is actually being transmitted and, more particularly, at the time that the switch 780 is changed from its contact with terminal 784 to the up position and the data converter 738 is actually processing data. The post detection baud metric 798 responds to the last two dibits of the frame being transmitted. If a (11) dibit is found, as produced by the data converter 738, the corresponding set of baud samples are run on a 4800 bps compromise equalizer (not shown) and the two radii are derived using equalizers and polar macros. Thus $R = EQX \cos(\phi) + EQY \sin(\phi)$. The difference between the two radii is scaled and fed to the baud servo.

Figure 14:
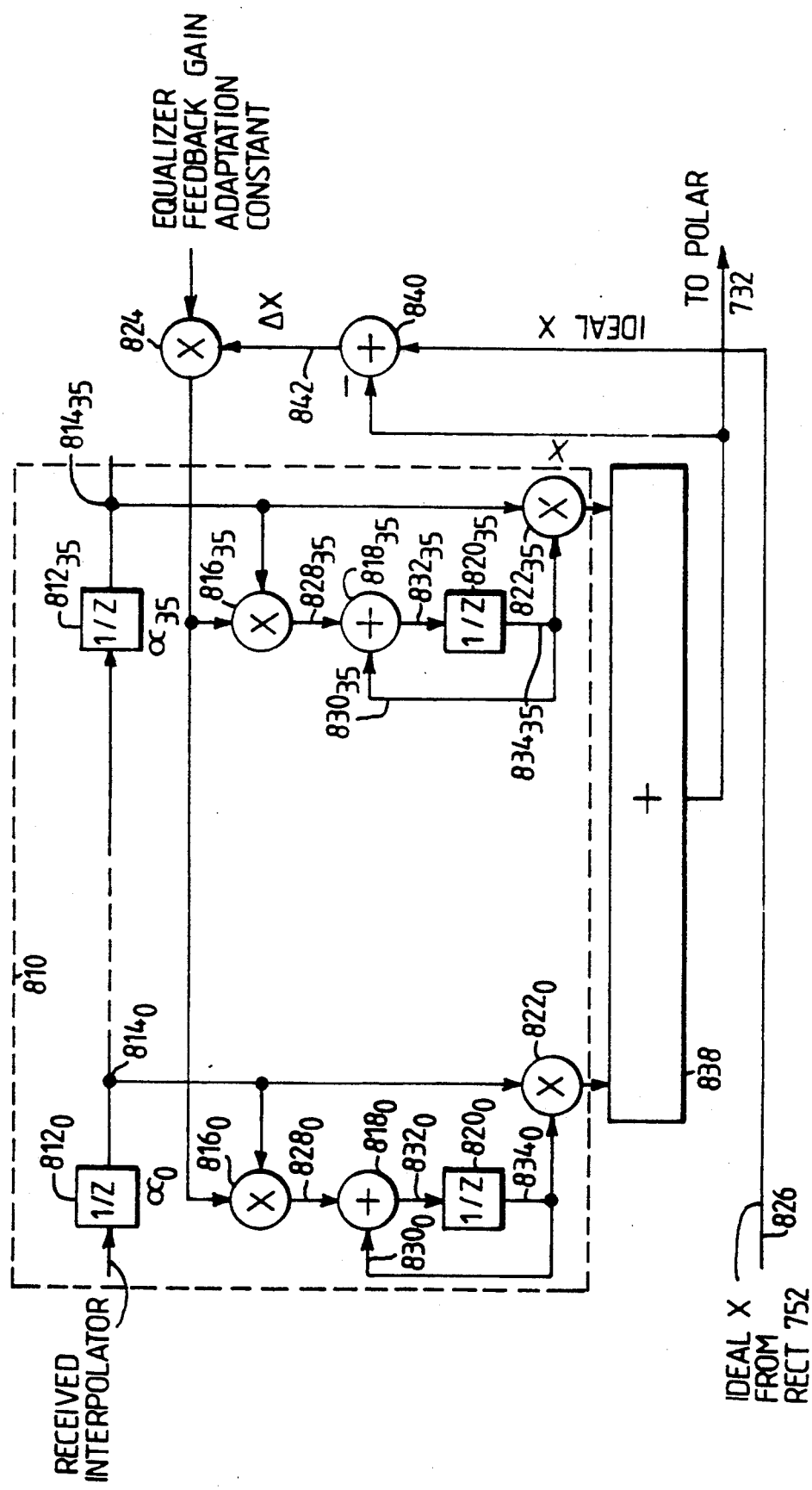
FIG. 14 is a signal processing diagram indicating the manner in which in phase equalization is implemented under software control by the equalizer illustrated in FIG. 13.

Referring now to FIG. 14 there is shown a signal processing diagram indicating the manner in which in phase equalization is implemented under software control by the equalizer illustrated in FIG. 13. In FIG. 14 there is shown a signal processing diagram indicating the manner in which phase equalization is implemented under software control by the equalizer 730 shown in FIG. 13 and the adaptation unit 748. For purposes of facilitating understanding the equalizer unit 730 may be considered to comprise function blocks outside the dashed blocks in FIG. 14 while the adaptation unit 748 comprises the function blocks shown in FIG. 14 inside of the dashed blocks. Further, it should be noted, that inputs and outputs set forth in FIG. 14 correspond to those present in FIG. 13. As shown in FIG. 14 the output of the interpolator 728, as present in FIG. 13, is supplied as received interpolator signals to the input of a delay line formed by 36 one sample delays $812_0$-$812_{35}$.

Each of the 36 one sample delays $812_0$-$812_{35}$ is present to provide an output signal corresponding to one of the 36 taps of the delay line formed, as indicated by taps $814_0$-$814_{35}$.

Each tap $814_0$-$814_{35}$ has an alpha or real tap processing network $\alpha_0-\alpha_{35}$ associated therewith. Each real or alpha processing network $\alpha_0-\alpha_{35}$ comprises a multiplier $816_0$-$816_{35}$. In addition, each tap $814_0$-$814_{35}$ has a complementary quadrature processing network (not shown) which is identical to the real processing networks $\alpha_0-\alpha_{35}$ illustrated in FIG. 14. Those of ordinary skill in the art will appreciate that the quadrature processing networks $\beta_0-\beta_{35}$ are connected to the taps $814_0$-$814_{35}$ in precisely the same manner as indicated for the real taps $\alpha_0-\alpha_{35}$ and comprises the same elements. Thus, an understanding of a full circuit comprising both real and quadrature taps would be facilitated by envisioning circuits symmetrical to the processing networks $\alpha_0-\alpha_{35}$ connected to taps $814_0$-$814_{35}$ in a manner precisely symmetrical with that shown for the real taps $\alpha_0-\alpha_{35}$.

The adaptation unit 748 has 36 identical blocks consisting of a multiplier and an accumulator. The product of inphase equalizer error ($\Delta X$) and equalizer feedback gain is multiplied by the sample at each tap. The product is accumulated and the values thus accumulate are the equalizer tap values.

Each of the tap processing networks $\alpha_0-\alpha_{35}$ receives a signal whose value corresponds to a scaled equalizer feedback gain adaptation constant from the output of the multiplier 824. The multiplier 824 receives, as indicated, an equalizer feedback gain adaptation constant which is maintained in a software memory and a value $\Delta X$ or scaling factor which corresponds to the difference between the real or in-phase component X and an ideal X value as output by the rectangular coordinate converter device 752 and applied to the input in FIG. 14 annotated 826. The scaled equalizer feedback gain adaptation constant is supplied at the output of the multiplier 824 to each of the tap processing networks $\alpha_0-\alpha_{35}$ in the manner indicated in FIG. 14 and is applied to the multiplier $816_0$-$816_{35}$ within each processing network. In addition, as plainly indicated, each multiplier $816_0$-$816_{35}$ receives an appropriately delayed sample from the delay line tap $814_0$-$814_{35}$ associated therewith. The output of each of the multipliers $816_0$-$816_{35}$ is applied via the conductors $826_0$-$826_{35}$ to a summing device $818_0$-$818_{35}$.

Each summing device $818_0$-$818_{35}$ additionally receives, at the input thereto annotated $828_0$-$828_{35}$, a value corresponding to the tap valuation from a previous sample or a tap history value. The output of the summing devices $818_0$-$818_{35}$ thus corresponds to the sum of the present adaptation tap value plus a previous value and is applied through the conductors $832_0$-$832_{35}$ to the single sample delays $820_0$-$820_{35}$. The output of each of the sample delays $820_0$-$820_{35}$ corresponding to the last tap valuation delayed by one sample is supplied through the conductors $834_0$-$834_{35}$ where it is returned as an input to the summing devices $818_0$-$818_{35}$ and is also supplied as an input to the multiplier devices $822_0$-$822_{35}$.

As plainly indicated in FIG. 14, the summing devices $822_0$-$822_{35}$ take the dot product of the valuation of the tap as provided on conductor $834_0$-$834_{35}$ and the sample associated with that tap as provided at the taps $814_0$-$814_{35}$. This value is provided to the summing device 838.

The summing device 838 produces a summation from 0-35 corresponding to a weighted tap value for each of the 36 taps involved. This corresponds to the real value of the vector or the EQX value indicated on conductor 750 in FIG. 12. This value is applied to the negative input of a summing device 840 within the adaptation unit 748 as illustrated in FIG. 13. In addition, the summing device 840 receives an ideal value for X as applied thereto from the conductor 826. This value, it will be recalled, is produced by the rectangular coordinate converter 752 as a result of the ideal angle produced by device 778 on conductor 790 as shown in FIG. 13. The difference between the ideal value of X and the real value of X is produced by the summing device 840 on the conductor 842 where the same represents a scaling quantity $\Delta X$ which is employed by the multiplier 824 to scale equalizer feedback gain constants supplied thereto.

The equalizer process, as shown in FIG. 14 is run once per baud at 2400 bps. Thus, each time the equalizer process is run a given sample will proceed through six taps or delay intervals on the delay line indicated by the delays $812_0$-$812_{35}$. This will also occur for the quadrature or imaginary Beta components provided by way of the complementary circuits noted above. A steepest descent gradient control loop is thus formed and the equalizer tap values are driven to minimize the mean square equalizer error.

Thus, under these circumstances it will be seen that X and Y values are provided at the output of the equalizer on the conductor 756 illustrated in FIG. 13 and once applied to the polar coordinate generator 732 an equalized value of $\phi$ is obtained. Once $\theta$ is subtracted by the subtraction device 760 in FIG. 13, the value of MR is obtained which, when added to $\phi$, enables the ideal value of $\phi$ to be obtained and subsequently applied to the rectangular coordinate generator 752 from which ideal values of X and Y may be obtained.

Figure 15A:
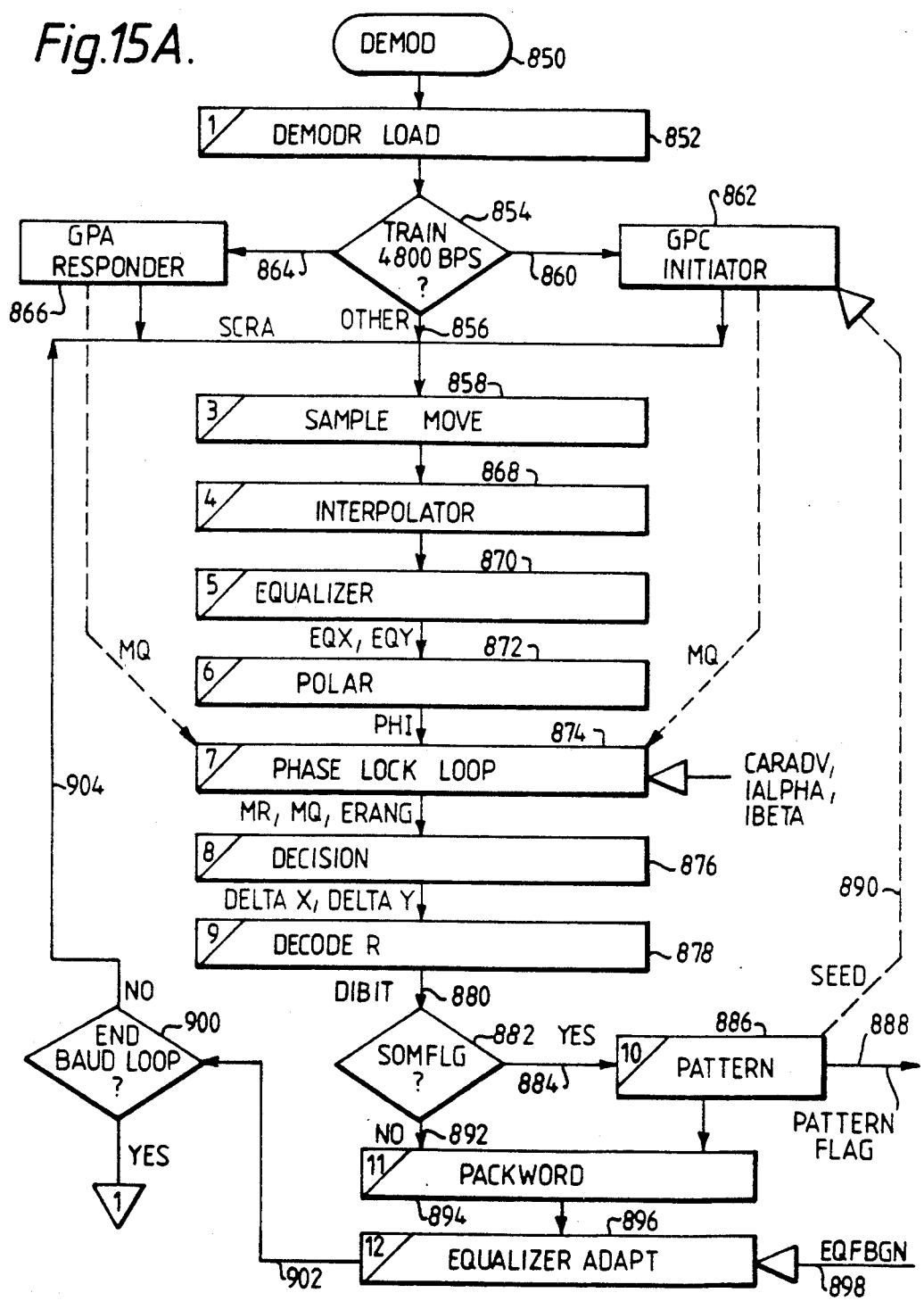
Figure 15B:
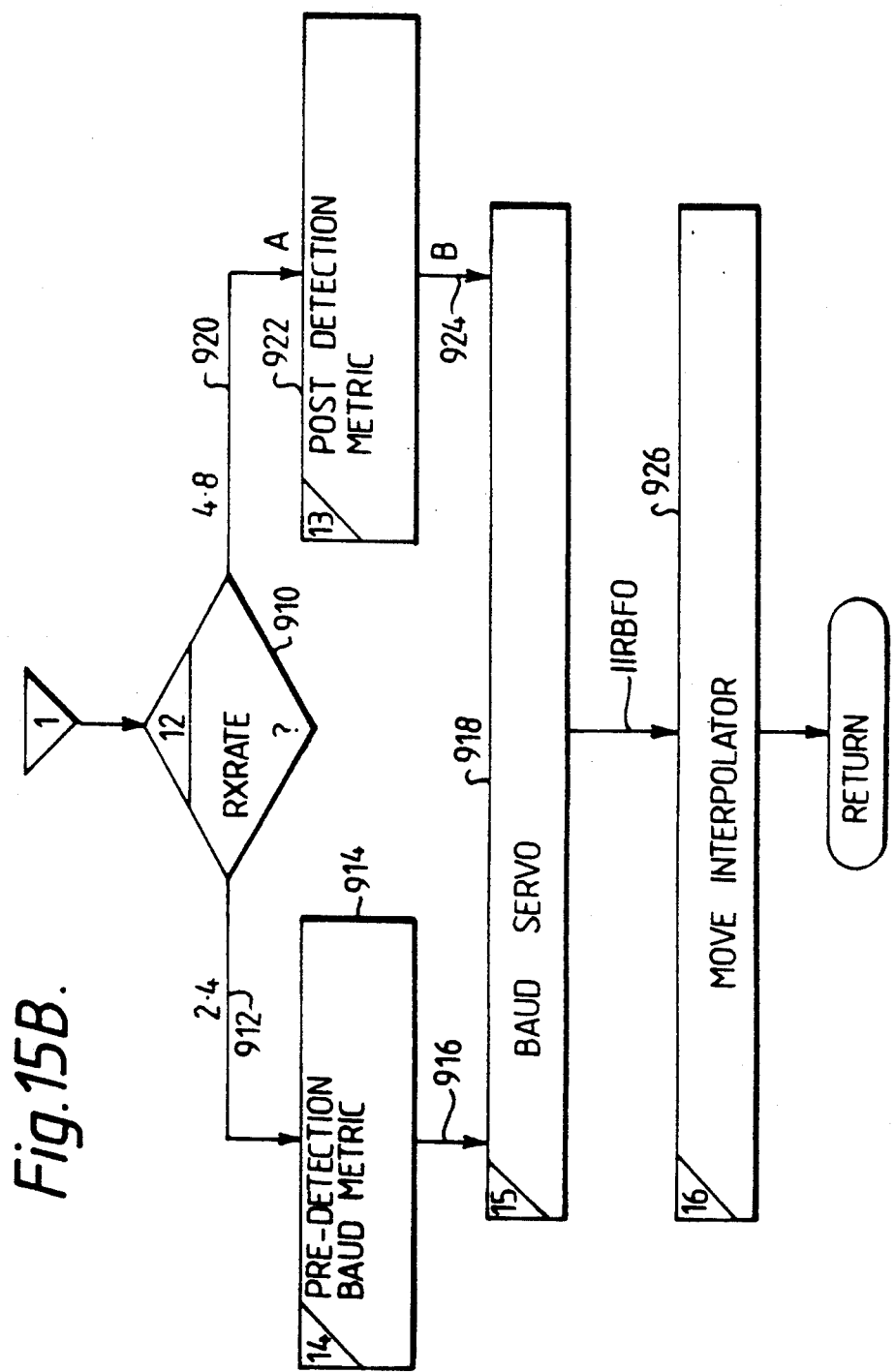

Referring now to FIGS. 15A and 15B there is shown a flow chart setting forth the details of the operation of the demodulator 726 shown in FIG. 13. FIGS. 15A and 15B set forth a complete flow chart wherein FIG. 15A sets forth a first portion thereof while FIG. 15B sets forth the remainder.

As shown in FIG. 15A, the demodulator program, when entered, as indicated by the oval flag 850, initially acts to load 36 samples from the transfer in buffer 116, as shown in FIG. 1, to the demodulator receive buffer, as indicated by the rectangle 852. As was briefly discussed in connection with FIG. 13, 36 samples are transferred at the beginning of each 5 ms frame. The demodulator load module converts these samples from a 72 byte format to 36 words and stores the converted samples in the demodulator input buffer (DEMODR).

Thereafter, as indicated by the diamond 854, the program tests as to whether or not training is to be conducted at 4800 bps. If training is to occur at 2400 bps, as indicated by the arrow 856 annotated other, the program immediately acts to move samples from the demodulator into an appropriate buffer for the interpolator and equalizer shown in FIG. 13 in the manner indicated by the rectangle 858. However, if training at 4800 bps is to occur, the program determines whether or not it is the initiator or the responder in the transmission and hence whether the GPA or GPC tables mentioned in connection with block 786 in FIG. 13 are to be employed. Thus, as indicated by the arrow 860, if the modem is the initiator in a transmission the GPC tables are called in the manner indicated by the rectangle 862 and thereafter the program proceeds to the location indicated by the rectangle 858. Conversely, if the modem is a responder in a transmission, as indicated by the arrow 864, the GPA table is called for training in the manner indicated by the rectangle 866 and thereafter the program reverts to the location indicated by the rectangle 858.

The interpolator 728 and equalizer 730, as illustrated in FIG. 13, employ a common buffer. Therefore, the sample move step indicated by the rectangle 858 acts to move six samples from the DEMODR buffer into the processing unit for interpolation and equalization. Thereafter, as indicated by the rectangles 868 and 870, the interpolator and equalizer programs are called. Following a calling of the interpolator and equalizer programs, in the manner indicated by the rectangles 868 and 870, the polar coordinate conversion program is called in the manner indicated by the rectangle 872 so that the X and Y or real and imaginary equalizer components may be transformed into polar coordinates in the manner described in connection with the block 732 in FIG. 13. Thereafter, as indicated by the rectangle 874, the phase lock loop program is called so that the value of $\theta$ illustrated in FIG. 13 may be developed and thereafter the values of the angles MR, MQ and the error angle ERANG may also be developed. In addition, when a 4800 bps rate train is involved, the values for the angle MQ are supplied for the phase lock loop program from the appropriate GPA responder or GPC initiator tables as indicated in FIG. 15A. Further, as also indicated in FIG. 15A, the carrier advance (CARADV) and the real and quadrature components (IALPHA and IBETA) for the phase lock loop are externally supplied.

The decision module program is then called in the manner indicated by the rectangle 876. The decision module runs the program necessary for the rectangular coordinate converter 752, as shown in FIG. 13, and computes the ideal equalizer output X and Y, as noted on FIG. 13, from the $\phi$, ERANG and R values where R is the ideal radius. From the X and Y values, and EQX and EQY provided at the output of the equalizer 730, the decision program computes the error at the equalizer ($\Delta X$ and $\Delta Y$ where $\Delta X$ equals EQX-X and $\Delta Y$ equals EQY-Y).

Thereafter, as indicated by the rectangle 878, the decode R program is called. The decode R program implements the function of the block 734 illustrated in FIG. 13 wherein differential phase shifts (MQ-MQ passed) are transformed into data dibits. Once this is done the program moves, as indicated by the arrow 880 and the diamond 882, to determine whether or not the start of message flag (SOMFLG) is set. If this flag is set the program branches as indicated by the arrow 884 annotated yes to perform a pattern search in the manner indicated by the rectangle 886. If the pattern is detected, the pattern flag is set in the manner indicated by the arrow 888. When the modem is training at 2400 bps and a start of message is received, special seed processing is carried out in case the final mode will be 4800 bps. When the start of message flag is detected the start of message search algorithm must look up GPA and GPC seeds in the table based on the baud count at the time of the detection. The algorithm then loads these seeds into the GPA and GPC devices, as indicated by the arrow 890, so that the 4800 bps training sequence will correspond precisely to the baud sequence to be received at 4800 bps ten frames later.

If the start of message flag is not set, as indicated by the arrow 892 annotated no, or upon the completion of the pattern search indicated by the rectangle 886, the program then calls the pack word routine indicated by the rectangle 894. The pack word routine, as indicated by the rectangle 894, serves to further implement the function of the data converter 738 in FIG. 13 by packing 8 dibits from the decoder into 16 bit words for transmission to the IOP. Data transfers to the IOP begins precisely following start of message detection, thus framing the data.

The program next calls the equalizer adapt routine, as indicated by the rectangle 896. The equalizer adapt routine basically fetches the values for $\Delta X$ and $\Delta Y$ as previously calculated as a result of the decision program 876 and causes the equalizer to adapt in the manner described in associated with FIG. 14. In this regard it should be noted that the equalizer feedback gain adaptation constant (EQFBGN) is externally supplied, as as indicated by the arrow 898. Thereafter, as is indicated by the diamond 900 and the arrow 902, the program next tests as to whether or not it is at the end of a baud loop by determining the presence or absence of the last baud. If the program is not at the end of the baud loop, as as indicated by the arrow 904 annotated No, loop back to the beginning of the routine initiated by the rectangle 858 occurs. If the end of the baud loop is present the program continues in the manner indicated in FIG. 15B.

When the end of the baud loop has been detected the program next tests, in the manner as indicated by the diamond 910 in FIG. 15B, to determine whether or not a 2400 or 4800 bps rate is being received. If a 2400 bps rate is present, as as indicated by the arrow 912, the predetection baud metric program is called in the manner indicated by the rectangle 914. The predetection baud metric program operates in the manner described in association with the block 744 present in FIG. 13. Each time the predetection baud metric program, indicated by the block 912, is run the results thereof, as as indicated by the arrow 916 are saved and the baud servo program is called in the manner indicated by the rectangle 918.

Similarly, should the test conducted in the manner indicated by the diamond 910 indicate that a 4800 bps rate is present, as indicated by the arrow 920, the post detection metric program, as indicated by the rectangle 922 is called. The post detection metric program operates in the manner described in connection with the post detection baud metric block 798, as illustrated in FIG. 13 and as further described below in connection with FIG. 16. It should be noted, however, that when a 4800 rate is present the system initially trains, as described in connection with FIG. 13, as if a 2400 bps rate were present and post detection baud metric procedures are not implemented until data outputting occurs. This, however, does not effect the program set forth as the baud servo is set to flywheel or is zeroed and as a result outputs from the post detection metric program 922 will not affect the demodulator.

After the post detection baud metric program is called, the program next proceeds as indicated by the arrow 924 to call the baud servo program in the manner indicated by the rectangle 918. The baud servo program acts to implement the operations described in connection with the baud servo 736 as illustrated in FIG. 13 to adjust the DEMODR output pointer and the interpolator delays. The predetection or post detection baud sync metric programs indicated by the rectangles 914 and 922, as well as the baud servo indicated by the rectangle 918, are run once per frame at the end of the frame. The baud servo is a second order loop which selects the interpolator to be used next frame and which increments or decrements the demodulator register output pointer (IIRBFO) when the interpolator address wraps around.

After the baud servo program is called in the manner indicated by the rectangle 918, the program next calls the move interpolator program, as indicated by the rectangle 926. The move interpolator program acts to move the interpolator selected by the baud servo to the on-chip program memory where it is employed in the next frame. Thus, while selection of an appropriate set of filters is initiated by the baud servo program 918, actual movement of the data associated therewith to the high speed chip of the microprocessor is accomplished by the move interpolator program indicated by the rectangle 926. After the move interpolator program is called in the manner indicated by the rectangle 926 the program returns to the calling routine as indicated by the oval flag 928.

Figure 16:
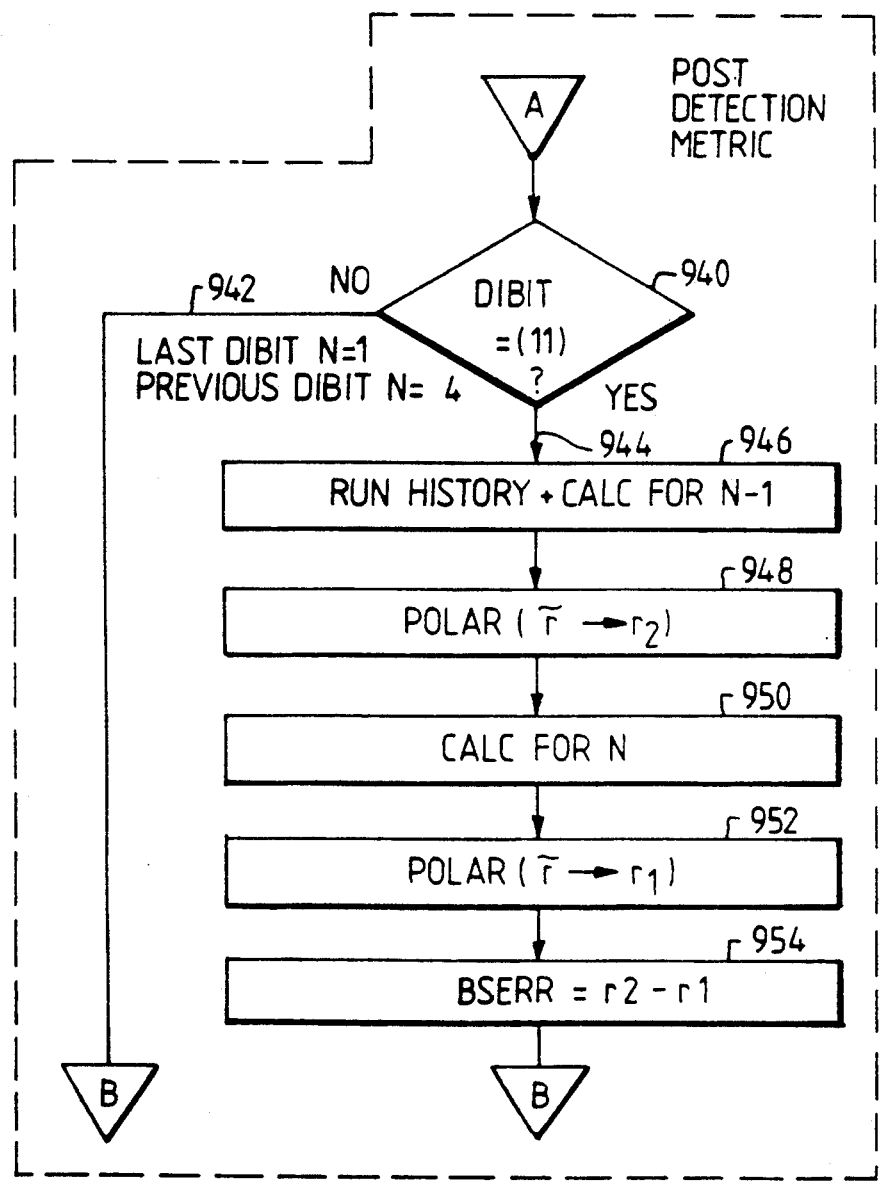
FIG. 16 is a flow chart illustrating the manner in which the post detection metric, shown in FIG. 13, is operated.

Referring now to FIG. 16, there is shown a flow chart illustrating the details of the post detection metric program associated with the rectangle 922 in FIG. 15B. When the post detection metric program is entered, as indicated by the diamond 940, the program first tests to ascertain whether a dibit condition equal to 1,1 is present in the last two dibits. If no dibit in this condition is ascertained, as indicated by the arrow 942 annotated no, the program is immediately exited. This will cause the baud servo program to be called in the manner indicated in FIG. 15B. However, if a 1,1 dibit is found the corresponding set of baud samples are run on a 4800 bps reference equalizer and two radii are derived using equalizer and polar coordinate routines. More particularly, as indicated by the arrow 944 annotated yes, samples are run, a position is selected on the historical taps based on the next to last dibit $N-1$ and the cartesian coordinants therefor are obtained in the manner indicated by the rectangle 946. Thereafter, as indicated by the rectangle 948, a polar coordinate routine is called and the radius for the value of the vector calculated in 946 is derived. This radius is designated $R_2$. As indicated by the rectangle 950, a vector for the last sample N is calculated from the historical taps and subsequently the polar coordinants for this vector are calculated in the manner indicated by the rectangle 952 and the radius calculated is designated $R_1$. Both the radii $R_1$ and $R_2$ are the two radii nearest the transition through zero. Thereafter, as indicated by the rectangle 954, the radii are subtracted and the difference therebetween is supplied to the servo, as indicated by the exit notation B.

The reference equalizer is a copy of the equalizer achieved just after the training sequence ends. The working equalizer continues to adapt during data demodulation whereas the reference equalizer remains fixed. The post detection process in effect holds the significant working equalizer taps to the same local where the reference equalizer taps are large.

The multiple rate modem apparatus, according to the instant invention is viewed as highly advantageous in that the modem function is integrated into a line system function where echo cancellation is provided. The aspect of integration reduces costs and provides functional control. The advantage of echo cancellation provides a full duplex modem utilizing only two wires. Further, full duplex operation with the same data rate in each direction is highly desirable for secure voice applications.

While the instant invention has been disclosed in conjunction with a relatively specific embodiment thereof, various variations and adaptations thereof will readily occur to those of ordinary skill in the art. For example, while specific logic has been set forth and the ability of this logic to rapidly calculate dot product and negative logarithms has been used to a substantial degree, other logic in both discrete and integrated versions may be used as well as various functions, including that of calculating dot products and negative logarithms, may be separately implemented. Furthermore, with respect to both the equalizer and echo canceling aspects of the instant invention, varying numbers of taps may be employed to achieve the objects of the instant invention. However, it has been found that convergence is more quickly obtained by working with signals whose samples are not well correlated and where, in the equalizer, a shorter delay line is employed training occurs at a faster rate. It has also been found that convergence occurs faster by truncating the number of taps and working in the vector domain since working with complex vectors allows calculations to proceed in terms of frequency offset. Further, in implementing the instant invention, use of negative logarithms for achieving automatic gain control and tone detection has been found highly advantageous.

Each processor contains an executive program which initializes the system on reset or when power is turned on. Thereafter the executives execute a group of independent state machines once every 5 millisecond.

Basically the executives look for an event in a list addressed by the state of the state machine. If an event on the list has occurred, the executive executes a list of action routines listed for that event and changes to a new state also listed under the event. The executive in the I/O processor executes a modem supervisor machine followed by a modem controller. The DSP1 executive executes the transmitter state machine followed by the echo canceller machine, the AGC machine and finally the tone detector machine. The DSP2 executive executes a demodulator state machine. Following execution of all of the machines on their lists, the executives wait for a 5 millisecond real time interrupt and start over again. Interprocessor control is exercised over the message channels (see FIG. 1, blocks 24, 26, 34, 36, 60 and 100).

The modem supervisor receives higher level commands from the user interface and returns higher level status. Likewise it sets events in the modem controller and the modem controller does set supervisor events to signal completion of a command or a change in the state of the modem due to events internal to the modem or pertaining to the transmission channel.

The modem controller in turn sets events in and responds to events from all of the controllers in the DSP's, thus controlling the modem.

What is claimed is:

1. Echo cancellation apparatus for removing echo in received information comprising:
   a sample delay line having a plurality of taps;
   means for applying a transmit signal to said sample delay line, means for developing a cross correlation column vector between a given number of samples of said transmit signal over a given number of frames according to a tap position;

means for obtaining a new vector corresponding to the dot product function of an inverse transmit auto correlation matrix and said cross correlation column vector for each tap;

means for summing said new vector with said cross correlation column vector to obtain an echo estimate from the summed new vectors at each tap; and means for subtracting said echo estimate from said received information to develop modified received information with reduced echo.

2. The echo cancellation apparatus for removing echo in received information according to claim 1 wherein said echo estimate is derived in an adaptive manner by repetitively developing said echo estimate from said modified received information employing the use of a transmit auto correlation matrix as a whitening filter to speed convergence.

3. The echo cancellation apparatus according to claim 1 wherein said means for developing a cross correlation column vector between a given number of samples of said transmit signal over a given number of frames according to a tap position comprises:

a control processing state for each training phase of said taps, each signal control state having an input and an output;

means for applying an adaptation parameter to said input of each signal processing stage;

means for applying a tap sample signal associated with that tap to said input of each signal processing stage; and means for developing a column vector for each selected tap at said output of said signal processing stage for that tap.

4. The echo cancellation apparatus according to claim 3 wherein said means for applying an adaptation parameter comprises means for obtaining the product of an adaptive constant and an error signal.

5. The echo cancellation apparatus according to claim 1, wherein said means for developing said cross correlation column vector between a given number of samples over a given number of frames wherein said given number of samples is thirty-six over one hundred frames.

6. The echo cancellation apparatus according to claim 5, wherein up to 5 ms. of transmit echo is removed.

7. The echo cancellation apparatus according to claim 1, wherein said means for obtaining a new vector corresponding to the dot product function of an inverse transmit auto-correlation matrix and the cross-correlation column vector includes:

means for providing correlation between a received information sample with said echo solution removed and another received information sample; and means for providing a correlation sample at a small time interval determined by the frame rate.

8. The echo cancellation apparatus according to claim 1, further including means for obtaining an initial echo canceler solution having means for modifying said adaptation value to fractional values for purposes of improving echo cancellation.

9. The echo cancellation apparatus according to claim 1, wherein said means for subtracting said echo estimate from said received information to develop a modified received information includes means for supplying a signal to a gain multiplier for use in subsequent cancellations.

10. Echo cancellation apparatus for removing echo in received information, with said echo due to interference from a transmitted signal, comprising:

complex signal generator means for rotating baud impulses from the transmitter to provide a complex signal having different angles;

delay line means adapted to receive said transmitted signal and having a plurality of taps for providing a delayed transmit signal at each tap;

means responsive to said complex signal generator means for developing a vector history of information, which is the value of the vector in a previous frame, to be transmitted for each of said plurality of taps; and for forming a tap adaptation value;

means for storing a plurality of tap adaptation values;

means for obtaining a series of dot products for a vector for tap information and a corresponding tap adaptation value to obtain a series of tap echo estimates;

means for dividing received information into a plurality of vectors corresponding to tap values to minimize processing load; and means for summing said series of dot products and said vectors to obtain received information samples with said echo estimates removed.

11. The echo cancellation apparatus according to claim 10, wherein said echo estimates are derived in an adaptive manner by repetitively developing said echo estimates from received information samples with said echo estimates removed.

12. The echo cancellation apparatus according to claim 31, wherein said vector history of information to be transmitted comprises:

means for providing a plurality of transmit vectors each having a real and an imaginary part that are at the baud rate;

means for summing the real part of each transmit vector; to provide an indication of the tap position of the transmit signal; and means for rotating transmit vectors by the transmit carrier frequency to remove the imaginary part of said signal.

* * * * *